(12) United States Patent
Yasui et al.

(10) Patent No.: US 9,219,441 B2
(45) Date of Patent: Dec. 22, 2015

(54) MAGNET FLUX AMOUNT ESTIMATION DEVICE, SYNCHRONOUS MOTOR DRIVING DEVICE, AND ELECTRIC MOTOR CAR

(71) Applicant: KABUSHIKI KAISHA TOSHIBA, Minato-ku (JP)

(72) Inventors: Kazuya Yasui, Inagi (JP); Shun Taniguchi, Fuchu (JP); Masaru Kano, Mie-gun (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 59 days.

(21) Appl. No.: 14/186,133

(22) Filed: Feb. 21, 2014

(65) Prior Publication Data

US 2014/0232306 A1 Aug. 21, 2014

(30) Foreign Application Priority Data

Feb. 21, 2013 (JP) ................................. 2013-032391
Feb. 18, 2014 (JP) ................................. 2014-028775

(51) Int. Cl.
| | |
|---|---|
| *H02P 21/00* | (2006.01) |
| *H02P 21/14* | (2006.01) |
| *H02P 6/00* | (2006.01) |
| *H02P 21/06* | (2006.01) |

(52) U.S. Cl.
CPC ............... *H02P 21/141* (2013.01); *H02P 6/00* (2013.01); *H02P 21/0035* (2013.01); *H02P 21/06* (2013.01); *H02P 21/146* (2013.01); *H02P 2207/05* (2013.01)

(58) Field of Classification Search
CPC .... H02P 21/0035; H02P 21/06; H02P 21/146; H02P 2207/05; H02P 21/141; H02P 6/00; Y02T 10/643
USPC .............. 318/400.02–400.04, 400.32–400.34
See application file for complete search history.

(56) References Cited

U.S. PATENT DOCUMENTS

| | | | |
|---|---|---|---|
| 2011/0241586 A1* | 10/2011 | Tobari et al. ............. | 318/400.23 |
| 2014/0009147 A1 | 1/2014 | Taniguchi et al. | |

FOREIGN PATENT DOCUMENTS

| | | | | |
|---|---|---|---|---|
| JP | 2005051892 A | * | 2/2005 | ............. H02P 21/00 |
| JP | 2009-22091 | | 1/2009 | |
| JP | 2009022091 A | * | 1/2009 | |
| JP | 4223880 | | 2/2009 | |
| JP | 2009-177960 | | 8/2009 | |

* cited by examiner

*Primary Examiner* — Kawing Chan
*Assistant Examiner* — Bradley Brown
(74) *Attorney, Agent, or Firm* — Oblon, McClelland, Maier & Neustadt, L.L.P.

(57) ABSTRACT

According to one embodiment, a magnet flux amount estimation device includes a magnetic pole position detector configured to detect a magnetic pole position of a permanent magnet synchronous motor including a permanent magnet within a rotor; an inductance-equivalent value determination module configured to determine an inductance-equivalent value of a d-axis corresponding to a determined magnetic pole direction; and a magnet flux amount estimator configured to calculate an estimation value of a magnet flux amount of the permanent magnet, based on the inductance-equivalent value.

18 Claims, 17 Drawing Sheets

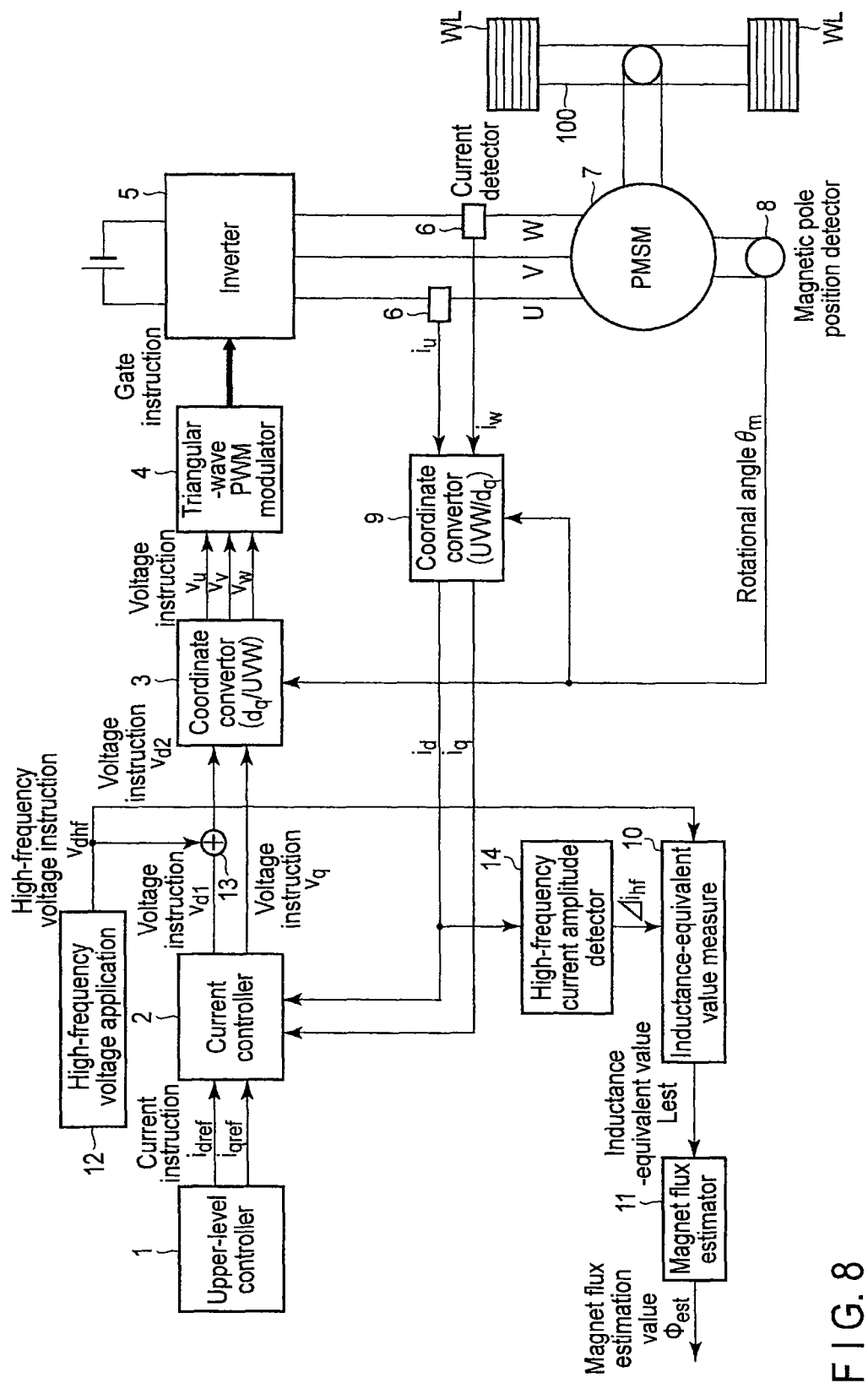
F I G. 8

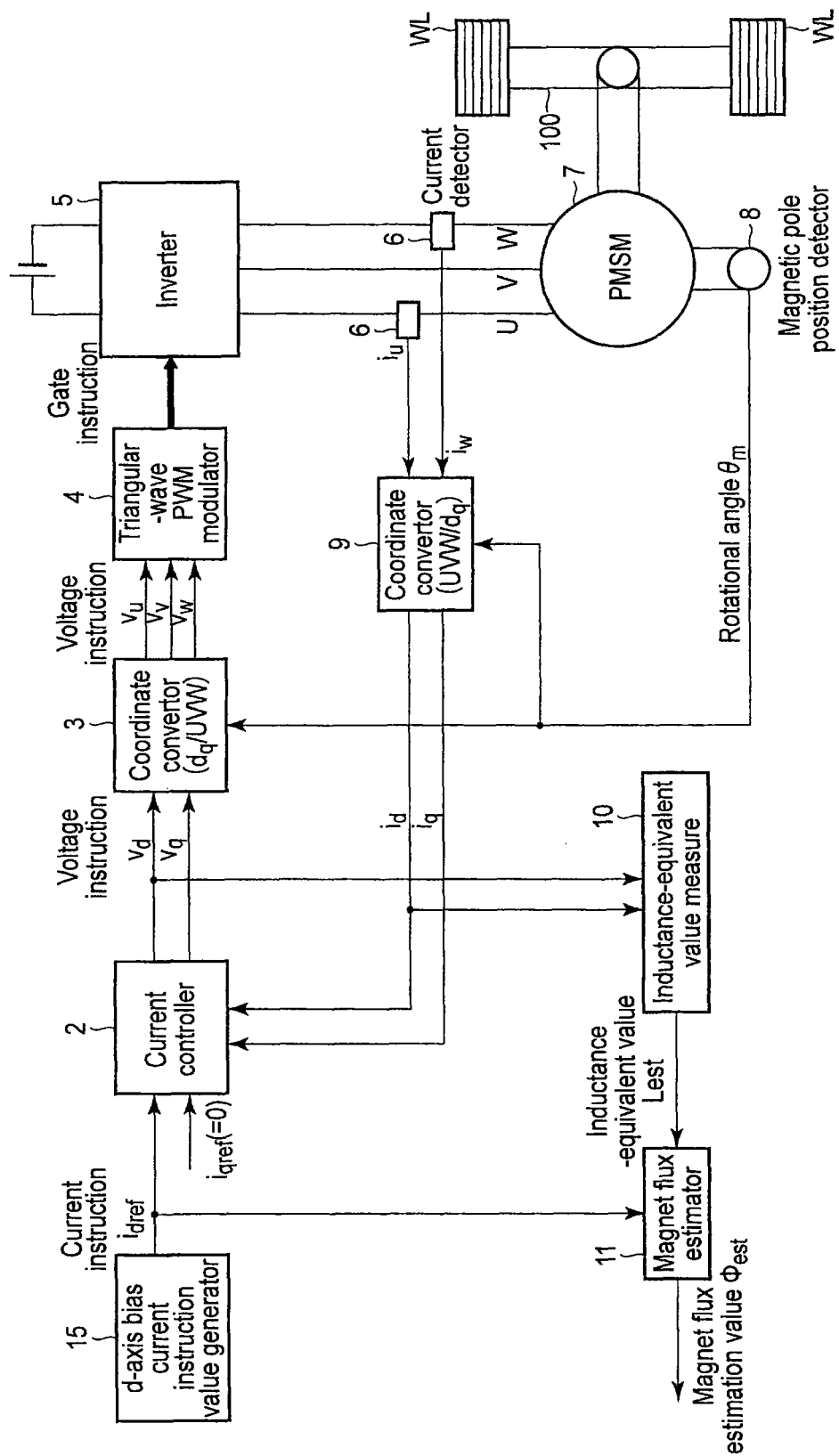
F I G. 10

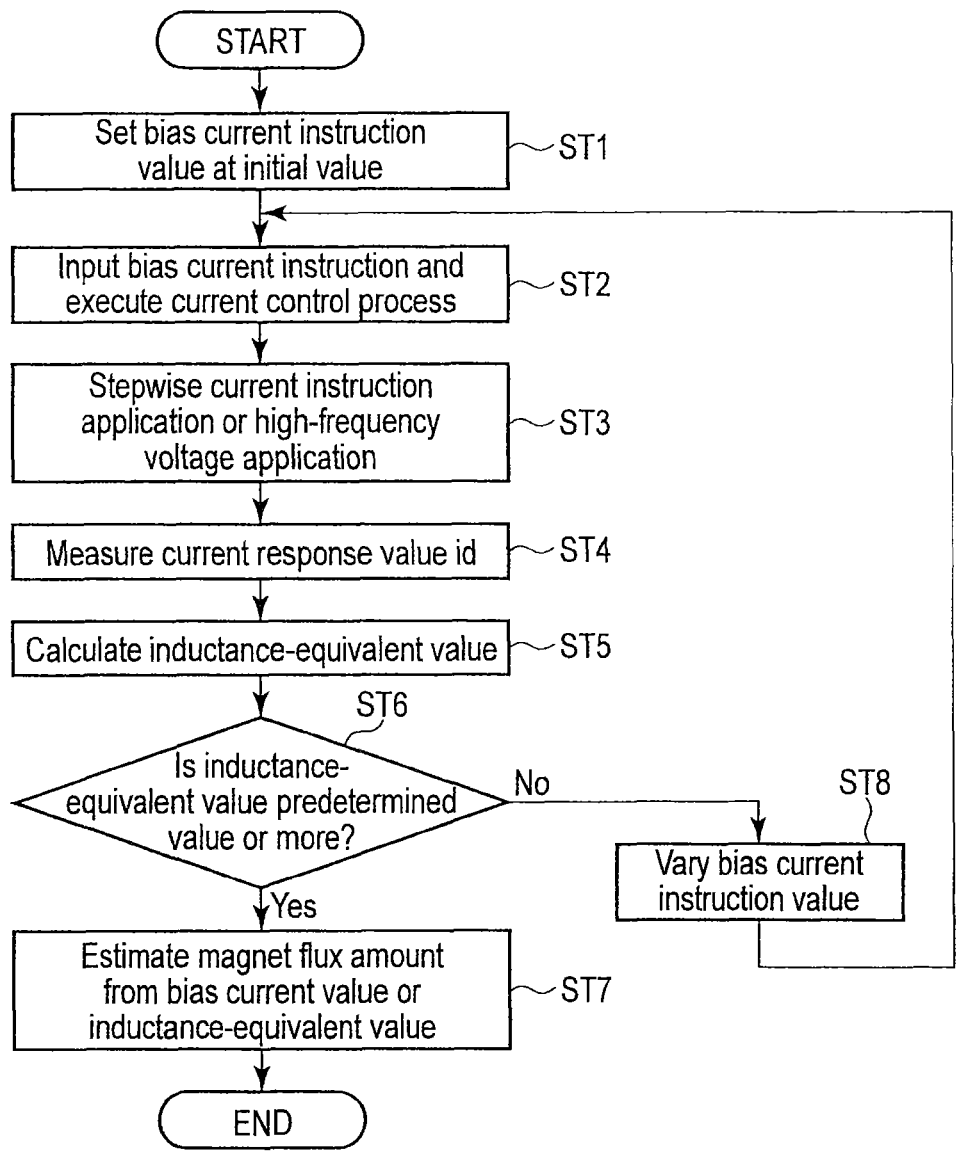
F I G. 12

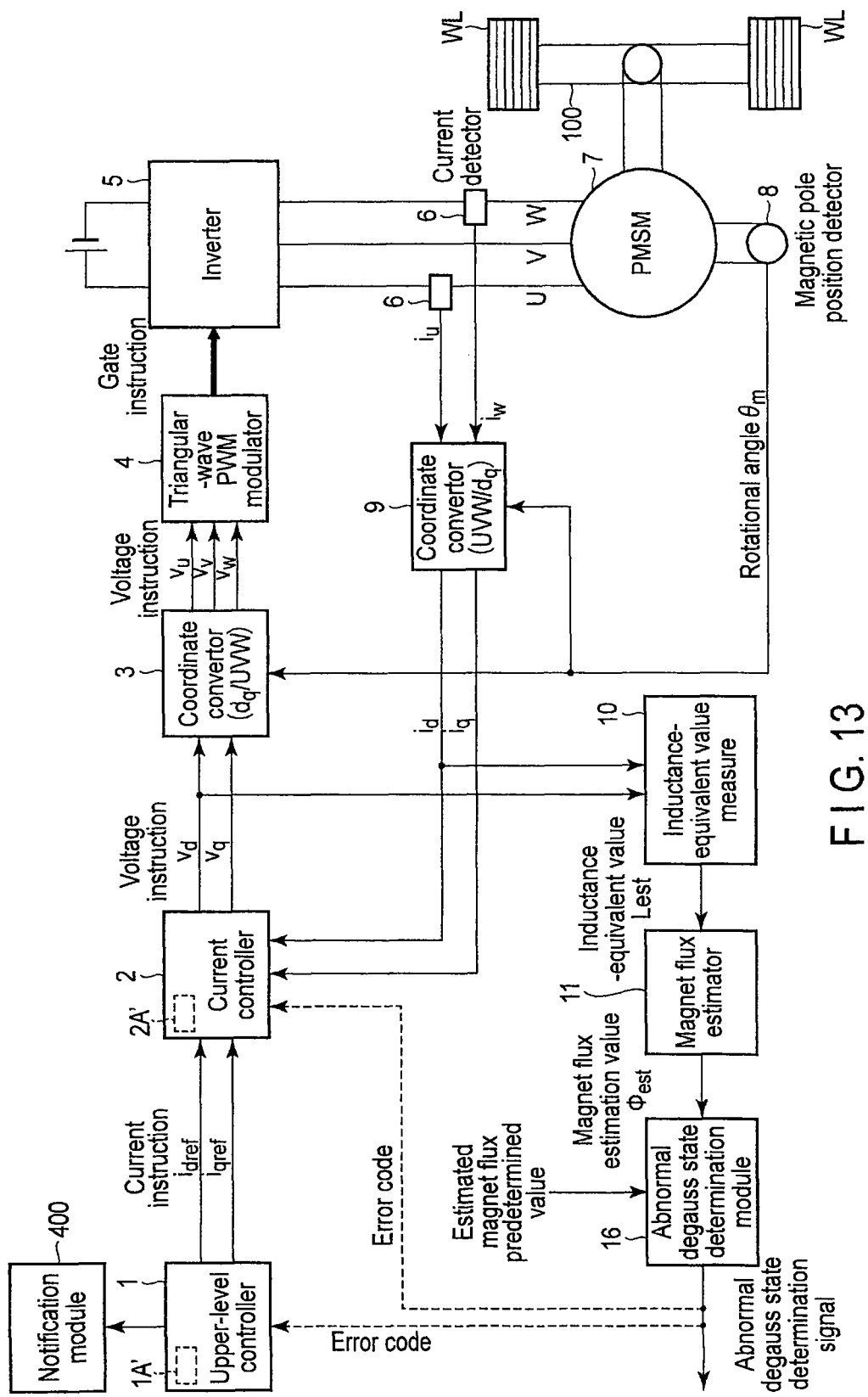
F I G. 13

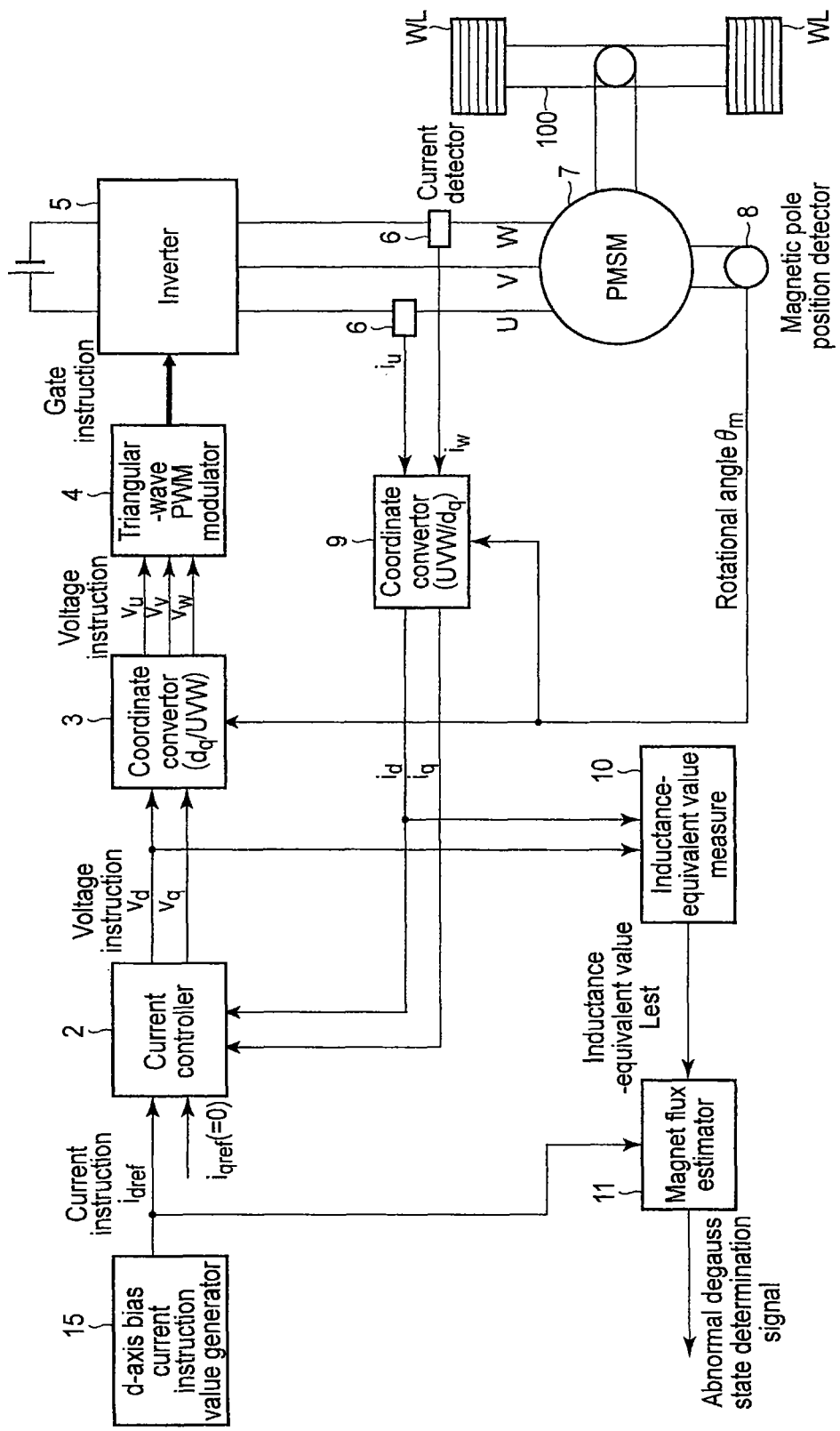
F I G. 14

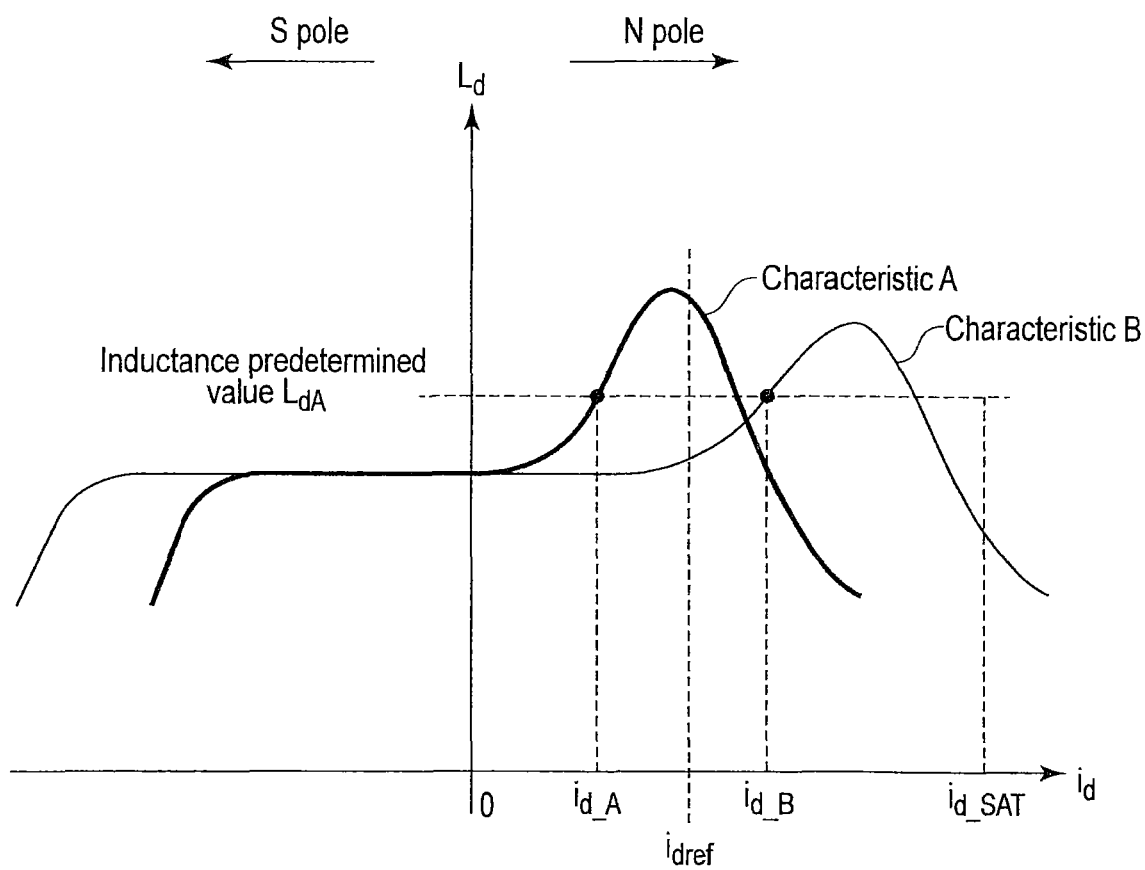
F I G. 15

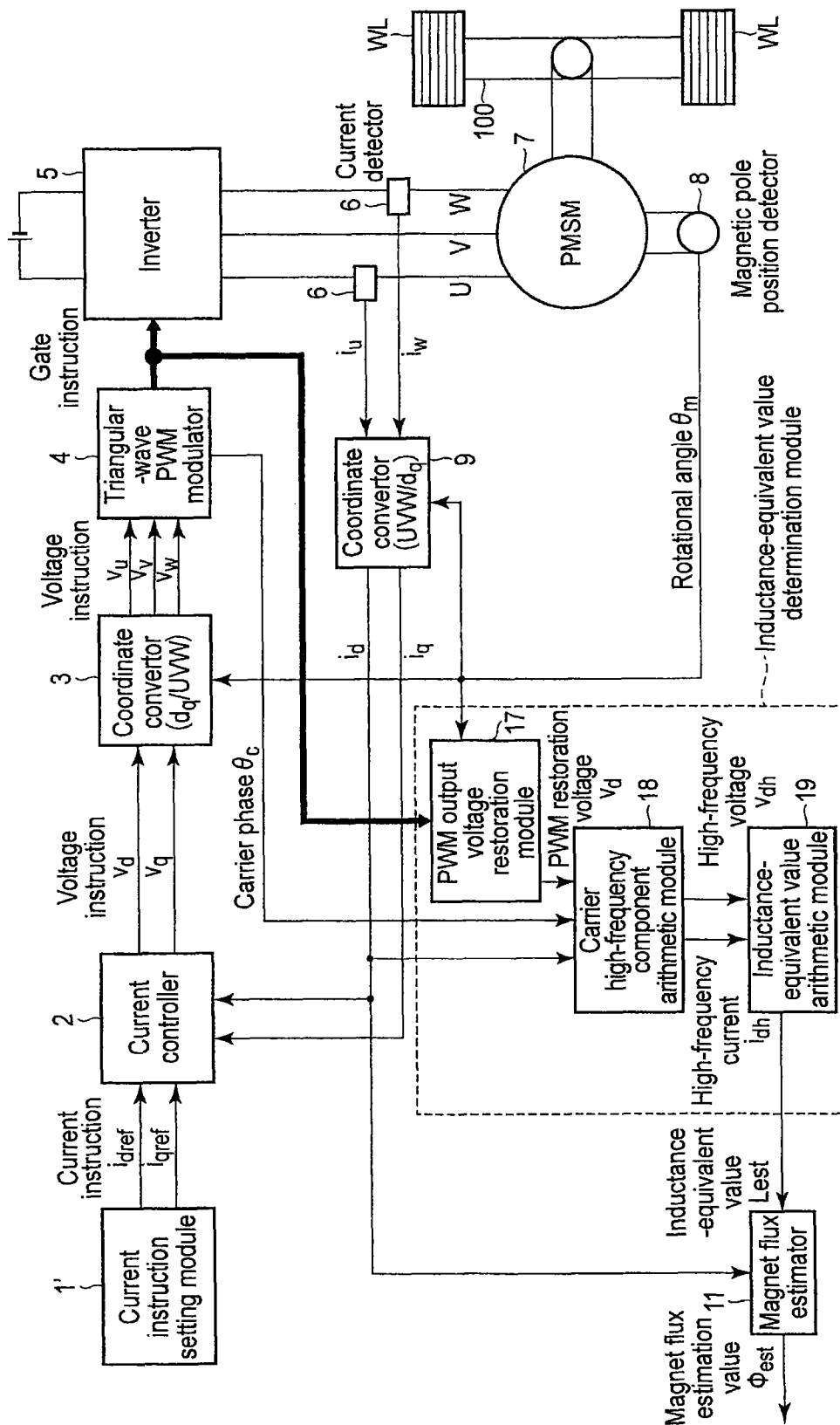
F I G. 16

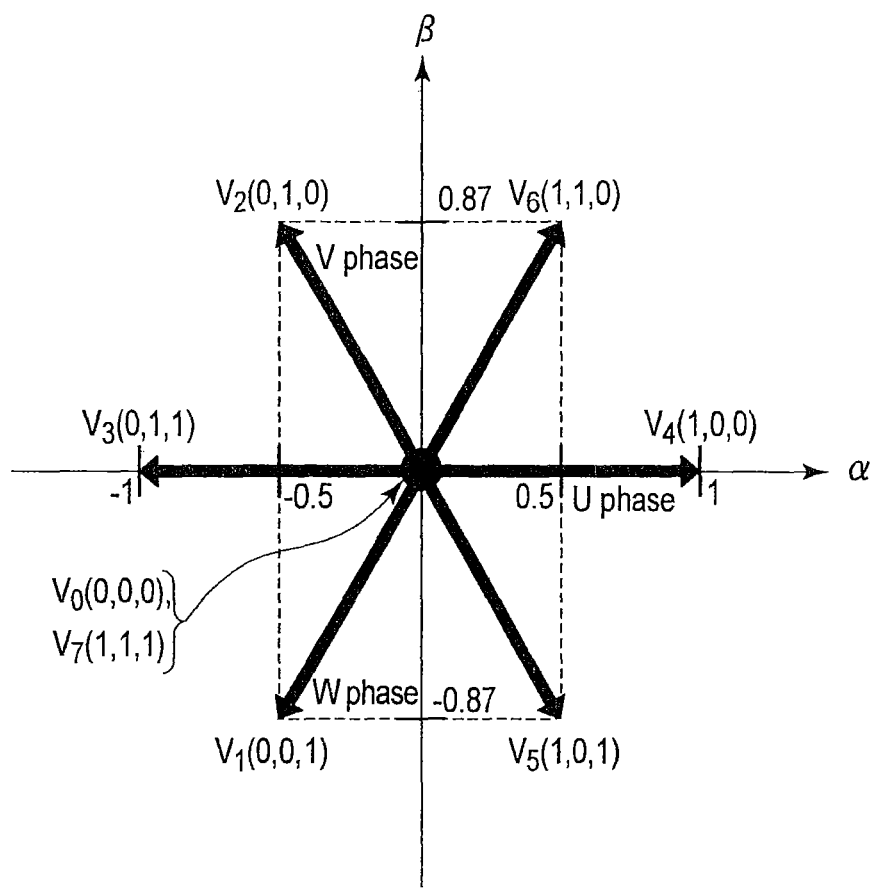
F I G. 19

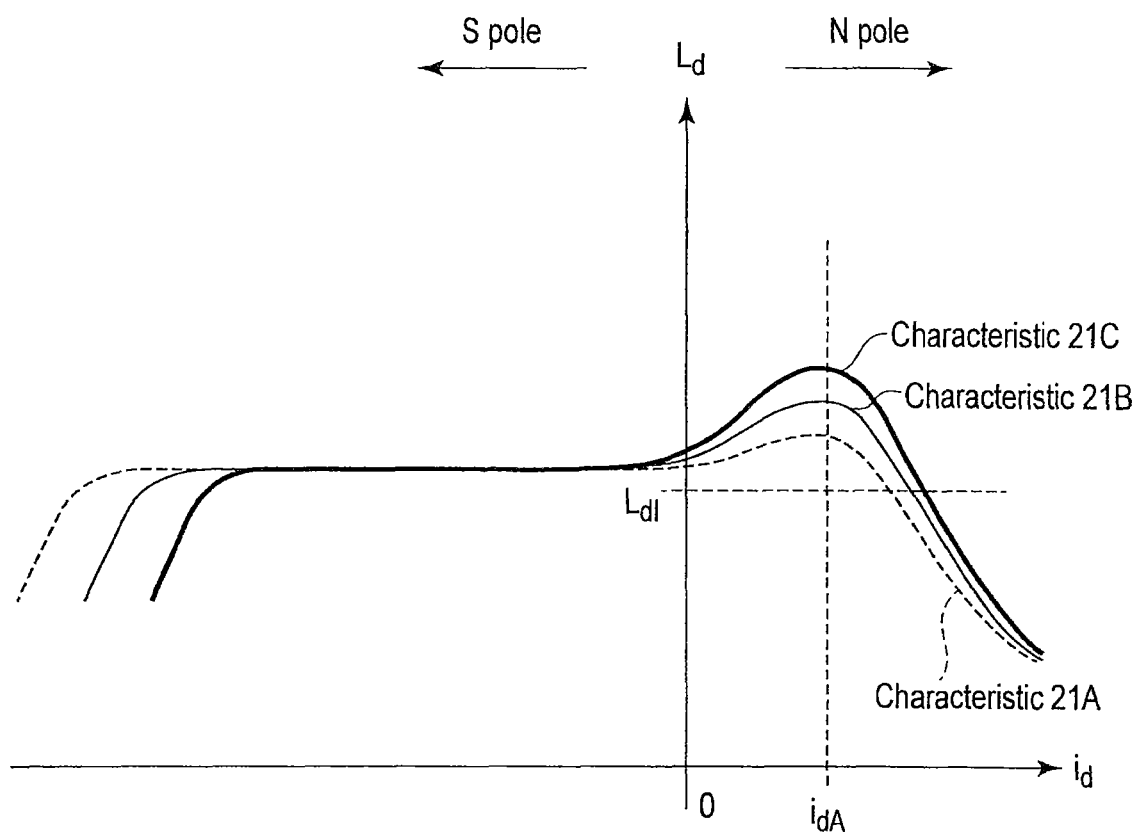
F I G. 21

MAGNET FLUX AMOUNT ESTIMATION DEVICE, SYNCHRONOUS MOTOR DRIVING DEVICE, AND ELECTRIC MOTOR CAR

CROSS-REFERENCE TO RELATED APPLICATIONS

This application is based upon and claims the benefit of priority from Japanese Patent Applications No. 2013-32391, filed Feb. 21, 2013, and No. 2014-028775, filed Feb. 18, 2014, all of which are incorporated herein by reference.

FIELD

Embodiments described herein relate generally to a magnet flux amount estimation device, an abnormal demagnetize determination device, a synchronous motor driving device, and an electric motor car.

BACKGROUND

In an interior permanent magnet synchronous motor (IPMSM), a permanent magnet is embedded within a rotor, thereby obtaining a high torque. A generated torque of the IPMSM is expressed by the sum of a magnet torque, which is a torque by a magnet flux, and a reluctance torque which occurs due to a variation of a magnetic resistance. Since the magnet torque is a torque which is proportional to a magnet flux, if a permanent magnet flux varies, the magnet torque will vary, and consequently the generated torque will vary. However, it is known that the permanent magnet within the rotor has such characteristics that the generated flux varies in accordance with the temperature of the permanent magnet itself. Specifically, the generated torque of the IPMSM varies in accordance with a temperature variation of the permanent magnet, and the precision of the actual output torque deteriorates, relative to an output torque reference of the motor.

In addition, if the temperature of the permanent magnet rises by a predetermined degree or more, there occurs a so-called "irreversible demagnetize" in which the magnet flux is not restored even if the temperature falls later. If the state of irreversible demagnetize has occurred, the output torque lowers as a matter of course, and a larger electric current needs to be caused to flow, in order to generate a required torque, leading to deterioration in efficiency of the motor.

In order to cope with the above situation, a technique for detecting the demagnetize state of the flux of the permanent magnet has been developed. In addition, there is known a demagnetize detection technique which was developed by applying a rotational angle sensor-less control technique of a permanent magnet synchronous motor.

In the above technique for detecting the demagnetize state of the flux of the permanent magnet, the demagnetize state of the magnet flux is detected by making use of such a characteristic that the voltage of the motor is proportional to the rotational speed of the motor, with the magnet flux being a proportionality coefficient. In this method, it is necessary that the motor is rotating at a sufficient speed, and the demagnetize state cannot be detected in the halt state.

In addition, in the demagnetize detection technique which was developed by applying a rotational angle sensor-less control technique of a permanent magnet synchronous motor, use is made of such a phenomenon that when a positive/negative bias current has been caused to flow in an estimated d-axis direction at a time of determining the NS polarity of the rotational angle sensor-less control, a magnetic saturation occurs by a composite flux of the flux generated by the bias current and the magnet flux, and the d-axis inductance lowers. Specifically, the demagnetize state is detected, based on the fact that, in the demagnetize state, no magnetic saturation occurs and the d-axis inductance does not lower. However, in this method, the positive/negative bias current needs to be caused to flow successively, and there is a problem that a length of time is needed for detecting the demagnetize state, and moreover it is impossible to detect or estimate the magnet flux amount itself.

BRIEF DESCRIPTION OF THE DRAWINGS

FIG. 8 is a view illustrating an exemplary structure example of a magnet flux estimation device, an abnormal demagnetize determination device, a synchronous motor driving device and an electric motor car of a second embodiment.

FIG. 10 is a view illustrating an exemplary structure example of a magnet flux estimation device, an abnormal demagnetize determination device, a synchronous motor driving device and an electric motor car of a third embodiment.

FIG. 12 is a view illustrating an exemplary control flow in the magnet flux estimation device, abnormal demagnetize determination device, synchronous motor driving device and electric motor car of the third embodiment.

FIG. 13 is a view illustrating an exemplary structure example of a magnet flux estimation device, an abnormal demagnetize determination device, a synchronous motor driving device and an electric motor car of a fourth embodiment.

FIG. 14 is a view illustrating another exemplary structure example of the magnet flux estimation device, abnormal demagnetize determination device, synchronous motor driving device and electric motor car of the fourth embodiment.

FIG. 15 is a graph illustrating an example of inductance characteristics in an abnormal demagnetize state and a normal state.

FIG. 16 is a view illustrating an exemplary structure example of a magnet flux estimation device, an abnormal demagnetize determination device, a synchronous motor driving device and an electric motor car of a fifth embodiment.

FIG. 19 is a view illustrating an example of spatial vectors of gate signals in αβ axes of a fixed coordinate system.

FIG. 21 is a graph illustrating an example of inductance characteristics in the magnet flux estimation device, abnormal demagnetize determination device, synchronous motor driving device and electric motor car of the fifth embodiment.

DETAILED DESCRIPTION

In general, according to one embodiment, a magnet flux amount estimation device includes a magnetic pole position detector configured to detect a magnetic pole position of a permanent magnet synchronous motor including a permanent magnet within a rotor; an inductance-equivalent value determination module configured to determine an inductance-equivalent value of a d-axis corresponding to a determined magnetic pole direction; and a magnet flux amount estimator configured to calculate an estimation value of a magnet flux amount of the permanent magnet, based on the inductance-equivalent value.

With reference to the accompanying drawings, a description will now be given of a magnet flux amount estimation device of a permanent magnet synchronous motor according to an embodiment, and a magnet flux amount estimation method.

First Embodiment

Figure 1:
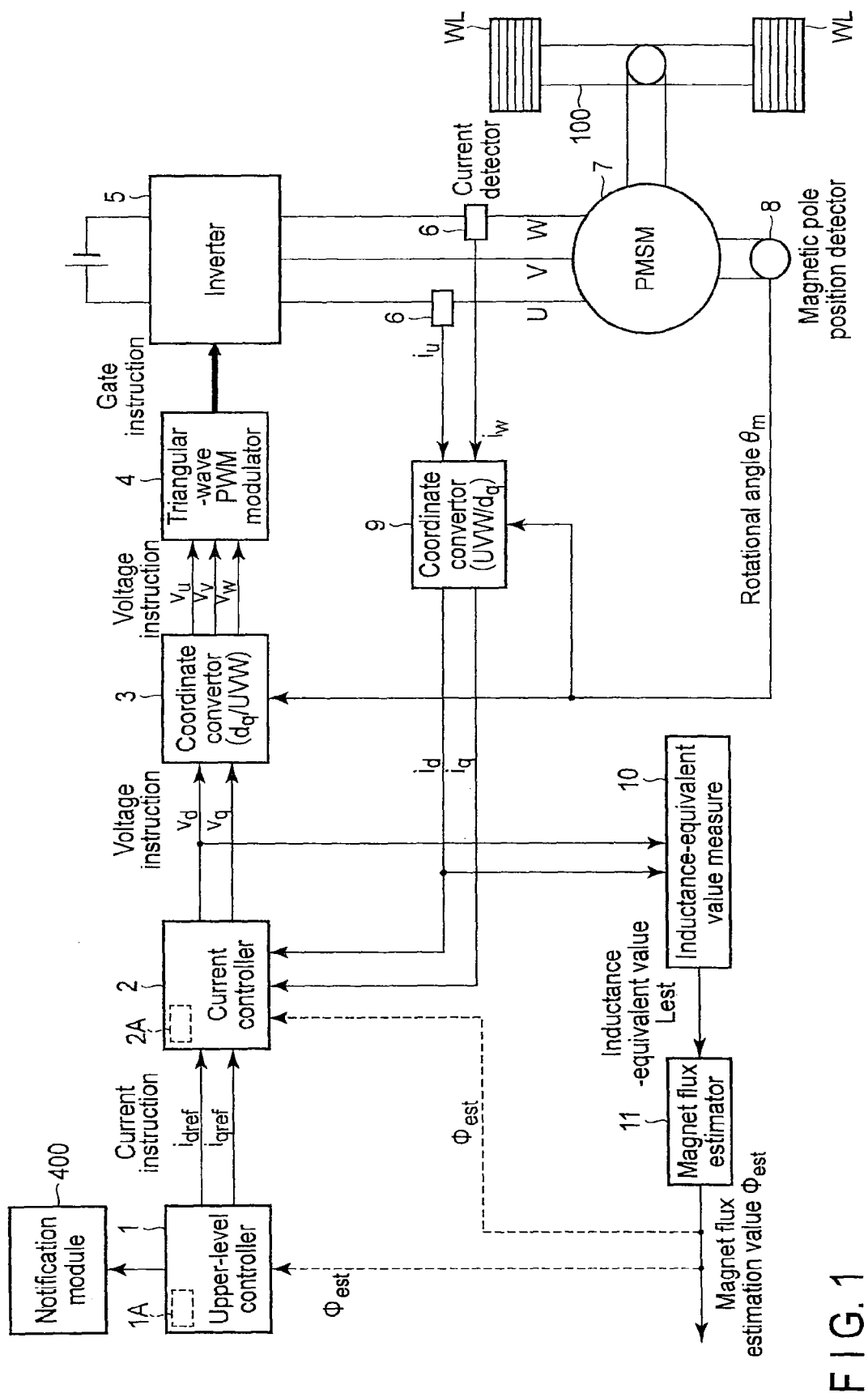
FIG. 1 is a block diagram illustrating an exemplary structure example of a system in which a magnet flux estimation device of a first embodiment is mounted.

FIG. 1 is a block diagram illustrating an exemplary structure example of a magnet flux estimation device, a synchronous motor driving device and an electric motor car of a first embodiment. Although a plurality of embodiments will be described below, the same structure as the structure of the present embodiment will be denoted by like reference numerals, and a description thereof is omitted.

The electric motor car shown in FIG. 1 includes an upper-level controller 1, current controller 2, coordinate convertor 3, triangular-wave PWM modulator 4, an inverter 5, current detector 6, a motor 7, magnetic pole position detector 8, coordinate convertor 9, inductance-equivalent value measure 10, magnet flux estimator 11, wheels WL, and an axle 100 for transmitting a rotational force of an AC motor M to the wheels WL.

The current controller 2, coordinate convertor 3 and triangular-wave PWM modulator 4 are included in an inverter controller for controlling the inverter 5, for example, based on a magnetic pole direction determined by the magnetic pole position detector, current reference values which are input, and a response current value of a current flowing in the motor 7.

The upper-level controller 1 converts, for example, a torque reference to current reference values idref, iqref of a dq-axis rotating coordinate system, and outputs the current reference values idref, iqref to the current controller 2.

The current controller 2 compares current response values id, iq, which are detected in the current detector 6, and the current instruction values idref, iqref, and determines voltage instruction values Vd, Vq.

The coordinate convertor (dq/UVW) 3 coordinate-converts, by using a rotational angle θm, the voltage instruction values Vd, Vq of the dq-axis rotating coordinate system to voltage instructions Vu, Vv, Vw of a three-phase fixed coordinate system.

The triangular-wave PWM modulator 4 modulates, by triangular-wave PWM, the voltage instruction values (modulation factor instruction values) Vu, Vv, Vw for driving the PMSM, and outputs gate signals which are ON/OFF references of each phase switching device of the inverter.

The inverter 5 receives, as input, the gate references for driving the inverter 5, and switches ON/OFF of a main circuit switching device which is built in the inverter 5, thereby alternately converting AC power and DC power. For example, a DC power supply, in which a plurality of secondary cells are combined, is connected from the outside to the inverter 5. The inverter 5 converts DC power of the DC power supply to AC power, and supplies the AC power to the motor 7, and can also convert regenerative power from the motor 7 to DC power and can charge the DC power supply.

The current detector 6 detects current response values of two phases or three phases of the three-phase AC current which flows from the inverter 5 to the PMSM 7. FIG. 1 illustrates a structure in which currents of two phases (U phase and W phase) are detected.

The motor 7 is a PMSM (permanent magnet synchronous motor). A magnetic field is generated by a three-phase AC current flowing in each excitation phase, and a torque is generated by a magnetic interaction with a rotor. A driving force generated by the motor 7 is transmitted to the wheels WL via the axle 100.

The magnetic pole position detector 8 is a module configured to detect a magnetic pole position of the permanent magnet synchronous motor including a permanent magnet within the rotor. For example, by a rotational angle sensor such as a resolver or an encoder, the magnetic pole position detector 8 detects the rotational angle θm of the rotor. In addition, in another method, the magnetic pole position detector 8 can electrically estimate the rotational angle of the rotor and can use the estimated value as a rotational angle value, by making use of a system which has been put to practical use as rotational angle sensor-less control.

The coordinate convertor (dq/UVW and UVW/dq) 9 coordinate-converts current values iu, iw of the three-phase fixed coordinate system to current values id, iq of the dq-axis rotating coordinate system, by using the rotational angle θ m.

The inductance-equivalent value measure 10 calculates a d-axis inductance Ld or an equivalent value thereof, from the voltage instruction value Vd and d-axis current response value id, and outputs the calculated value as an inductance-equivalent value Lest. The d-axis inductance Ld appears in a voltage equation of the PMSM, as indicated in expression (1) below. Since the d-axis inductance Ld is a correlation coefficient of the d-axis current response value id and dq-axis voltage value vd, vq, the relational expression of Ld can be expressed by a simple equation like equation (2), under the condition of, for example, the number of revolutions ω=0, iq=0.

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \begin{bmatrix} 0 \\ \omega \Phi \end{bmatrix} \qquad (1)$$

where
- vd, vq: d-axis voltage, q-axis voltage,
- id, iq: d-axis current, q-axis current,
- R: armature winding resistance,
- Ld: d-axis inductance,
- Lq: q-axis inductance,
- φ: permanent magnet flux,
- ω: rotational speed
- p: differential operator.

$$v_d = (R + pL_d)i_d \qquad (2)$$

In equation (2), when a DC component of the d-axis current is substantially zero and a d-axis current variation is sufficiently large, or when a high-frequency component of the d-axis current is dominant, a first term R can be ignored since the first term R is sufficiently smaller than a second term pLd, and Ld can be expressed by equation (3). The d-axis current is a current in the magnetic pole direction of the rotor. In the case of using the rotational angle sensor, as in the present embodiment, the d-axis current is a current in the magnetic pole direction detected by the rotational angle sensor. In the case of sensor-less control, the d-axis current is a current in an estimated magnetic pole axis direction.

$$v_d = pL_d i_d \qquad (3)$$
$$= L_d \frac{d}{dt} i_d$$

By making use of the relationship of equation (3), the d-axis inductance Ld can be expressed by equation (4).

$$L_d = \frac{v_d}{\frac{d}{dt} i_d} \qquad (4)$$

By equation (4), the d-axis inductance Ld can be calculated from the d-axis voltage vd that is applied to the motor 7, and a variation ratio d/dt·id of the d-axis current response id. In this case, the d-axis voltage is the voltage instruction value Vd in FIG. 1.

If the d-axis voltage vd that is applied to the motor 7 is constant, a value multiplied by a reciprocal number of the current variation ratio is the inductance value. Thus, even if the d-axis inductance Ld itself is not calculated, the current variation ratio or a reciprocal number thereof may be set as an inductance-equivalent value. Conversely, a d-axis voltage vd, at a time when the current variation ratio (the variation ratio of the current instruction value) is controlled to be constant, can be set as an inductance-equivalent value.

The magnet flux estimator 11 receives, as an input, the inductance-equivalent value Lest, and calculates a magnet flux estimation value φest. In the magnet flux estimator 11, for example, the magnet flux estimation value φest is calculated based on an inverse-proportion relational equation, like equation (5), with respect to the inductance-equivalent value Lest.

$$\phi_{est} = K \frac{1}{L_{est}} \qquad (5)$$

This is because, as will be described later, the magnet flux estimation value φest exhibits a characteristic that the magnet flux estimation value φest is substantially inversely proportional to an inductance-equivalent value which is measured at a predetermined operation point. In another estimation method, the inductance-equivalent value Lest and the flux φest may be stored in a table, and the flux φest may be found by referring to the table.

Next, a description is given of the principle in which the magnet flux can be estimated from the d-axis inductance-equivalent value Lest in the magnet flux estimator 11.

Figure 2:
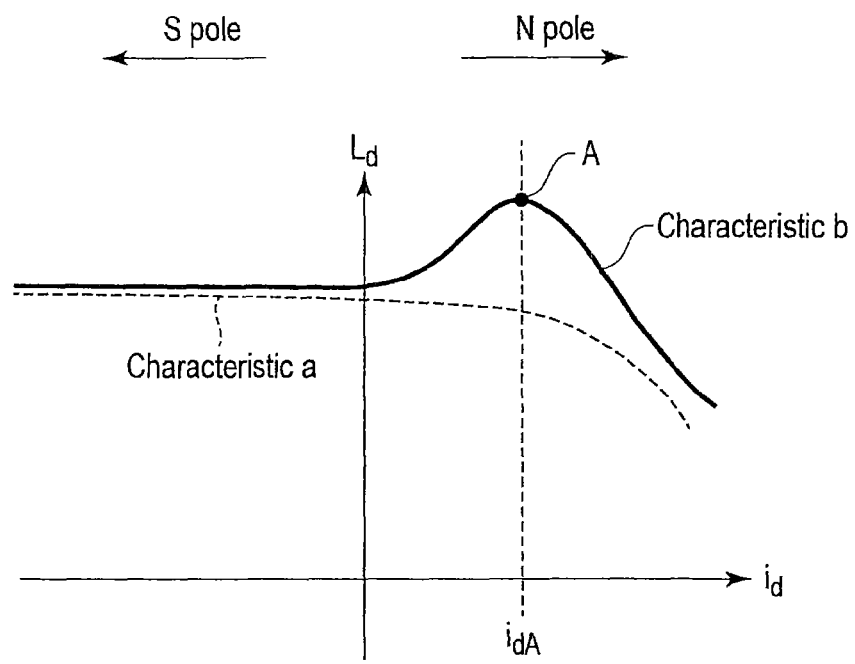
FIG. 2 is a graph illustrating an example of a d-axis inductance characteristic of a permanent magnet synchronous motor.

FIG. 2 is a graph illustrating an example of the d-axis inductance characteristic of the permanent magnet synchronous motor.

To begin with, the characteristics of the PMSM are described. That a positive current is caused to flow as a d-axis current by setting an N pole direction of the magnetic pole as a d-axis means that a current is caused to flow so as to intensity the flux of the magnet. In addition, it is assumed that the d-axis inductance Ld is determined by the following equation, from a d-axis current variation amount Δid and a d-axis flux variation amount Δφd.

$$L_d = \frac{\Delta \phi_d}{\Delta i_d} \qquad (6)$$

Then, in a general IPMSM, as indicated by a characteristic a in FIG. 2, with the influence of magnetic saturation in accordance with an increase of the d-axis current id, such a inductance characteristic is exhibited that the d-axis inductance decreases monotonically. However, the inventor discovered that an IPMSM having a structure to be described later has such an inductance characteristic that the d-axis inductance has a maximum point in a positive region in relation to the d-axis current id, as indicated not by the characteristic a but by a characteristic b, and that if the d-axis current id is made larger than the maximum point, the d-axis inductance decreases monotonically.

Figure 3:
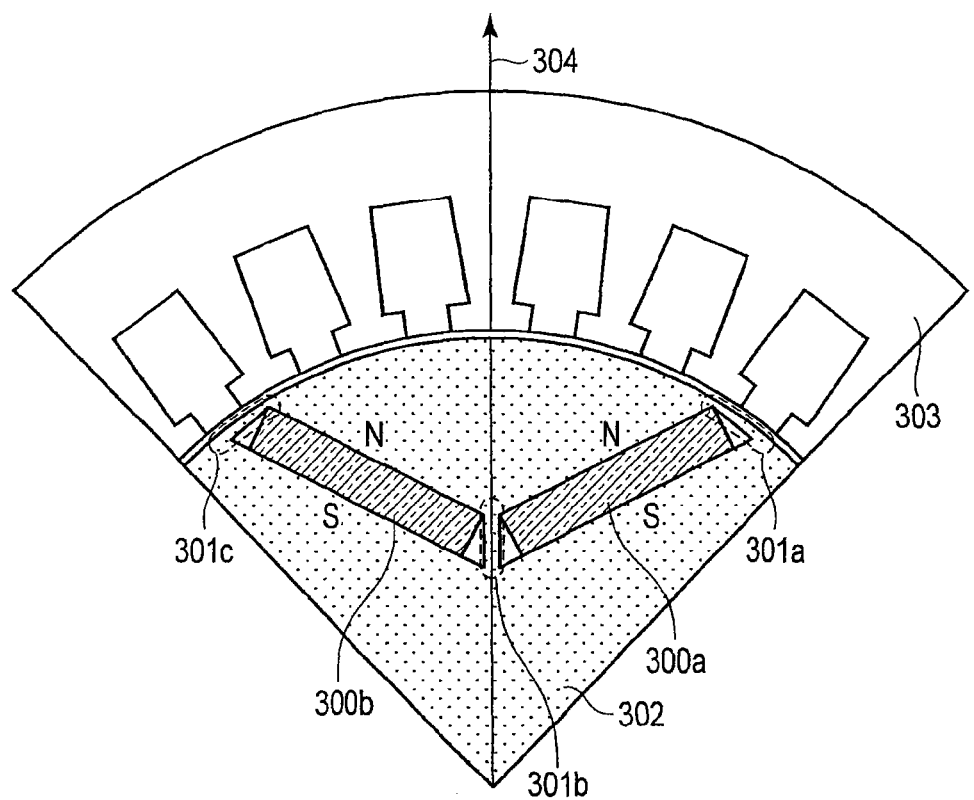
FIG. 3 is a view illustrating an exemplary structure example of the permanent magnet synchronous motor.

FIG. 3 is a view illustrating an exemplary structure example of the permanent magnet synchronous motor (IPMSM).

The IPMSM having the above-described inductance characteristic is an IPMSM having such a structure that, for example, as shown in FIG. 3, magnets 300a, 300b are embedded within a rotor of the IPMSM, and bridge portions 301a to 301c of an iron core are provided on both sides of each magnet. In the meantime, FIG. 3 shows a region of ¼ of the entire motor, and numeral 302 denotes a rotor iron core, 303 denotes a stator iron core, and 304 denotes a d-axis by definition of the rotor.

When the IPMSM has this shape, part of the flux produced from the N pole side of the magnet reaches the S pole side via the bridge portions 301a to 301c. Thus, the bridge portions are magnetically saturated by the magnet flux. At this time, if a positive current is caused to flow in the d-axis direction shown in FIG. 3, a flux is formed in the same direction as the d-axis direction 304 by the stator coil. Thus, the flux produced from the N pole of the magnet forms such a path as to reach the S pole side through the stator, without passing through the bridge portions 301a to 301c. The flux of the bridge portions 301a to 301c decreases, and the magnetic saturation of these portions is relaxed, and thus the d-axis inductance Ld increases. Further, if the d-axis current is increased, the magnetic path through the stator begins to be magnetically saturated, so the d-axis inductance decreases. Thereby, the inductance characteristic, like the characteristic b in FIG. 2, is obtained.

Figure 4:
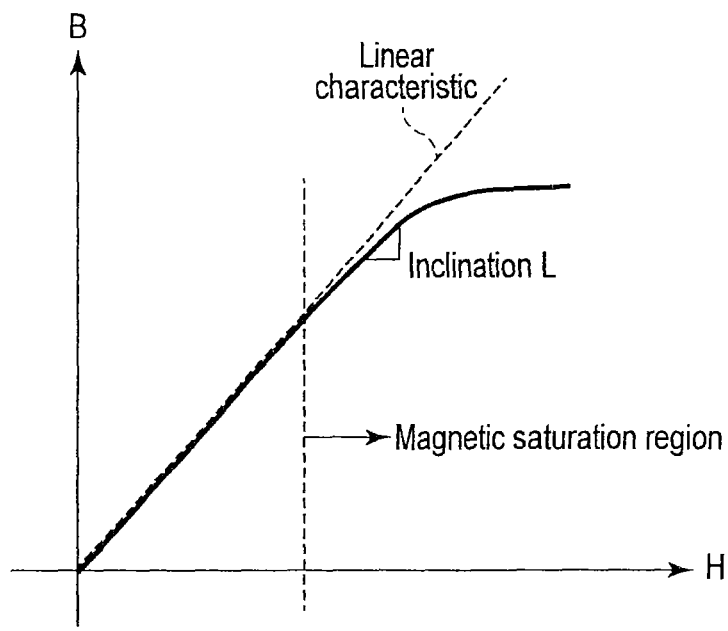
FIG. 4 is a graph illustrating an example of a saturation characteristic of inductance.

FIG. 4 is a graph illustrating an example of a saturation characteristic of inductance.

Incidentally, the term "magnetically saturated" or "magnetic saturation" means a state in which such a characteristic is exhibited that a flux B no longer linearly increases in relation to an increase of a magnetic field H due to an increase of a stator current, as shown in FIG. 4, and the flux B becomes smaller than a linear increase characteristic. Since the inductance is an increase coefficient (corresponding to an inclination L in FIG. 4) of the flux in relation to the increase of the flux, the inductance decreases in the magnetic saturation region.

Figure 5:
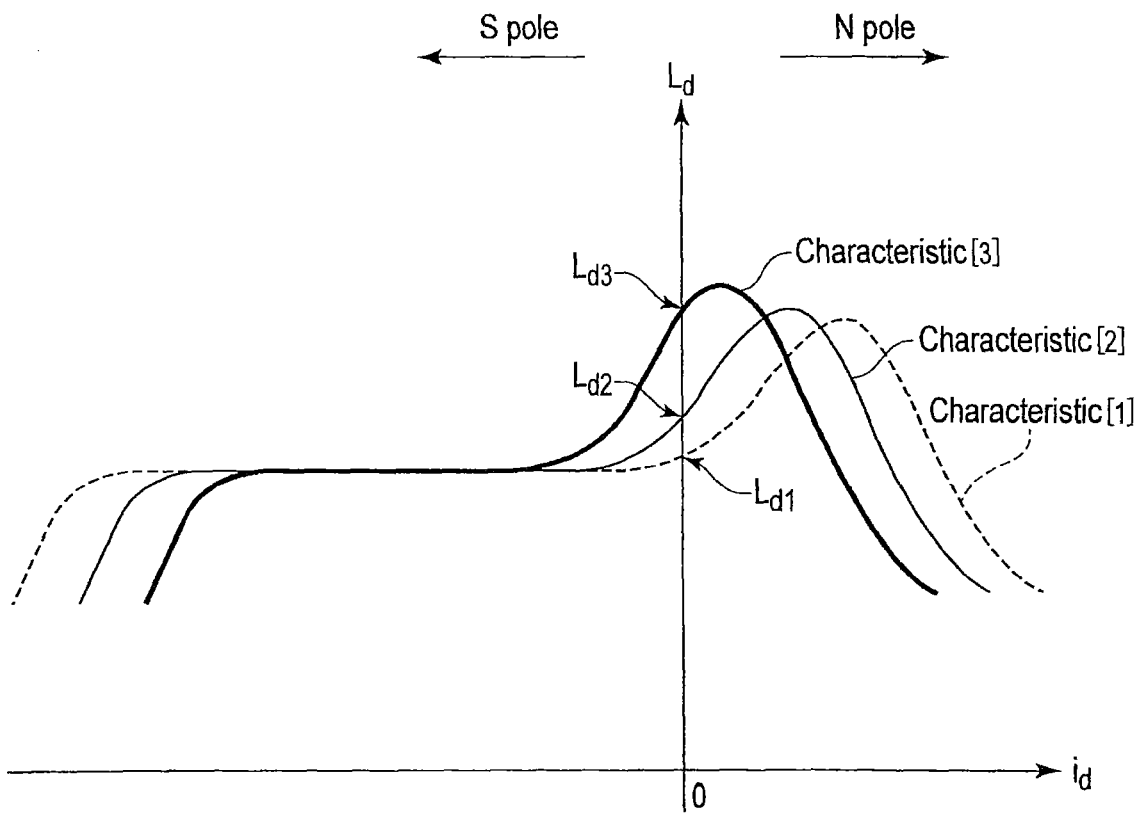
FIG. 5 is a graph illustrating an example of a d-axis inductance characteristic in a case where a magnet flux has varied.

FIG. 5 is a graph illustrating an example of a d-axis inductance characteristic in a case where a magnet flux has varied.

As described above, the factor of the characteristic b in FIG. 2 is that the flux of the magnet passes through the bridge portions, and causes magnetic saturation. Thus, if the flux of the magnet varies, a d-axis current value idA also varies at an operation point where the magnetic saturation of the bridge portion is relaxed when a positive current is caused to flow in the d-axis direction of the stator coil, that is, at a point A in FIG. 2. This variation is illustrated in FIG. 5.

In FIG. 5, a characteristic [1] indicates a case in which the magnet flux is a maximum flux in design, and a characteristic [2] and a characteristic [3] indicate demagnetizeed states therefrom. At this time, for example, since inductance values Ld1, Ld2 and Ld3 at id=0 exhibit the tendency of an increase, it is understood that if the magnet flux decreases when id=0, the inductance value increases. According to the above characteristics, an estimation value of the magnet flux can be calculated from the inductance value.

Figure 6:
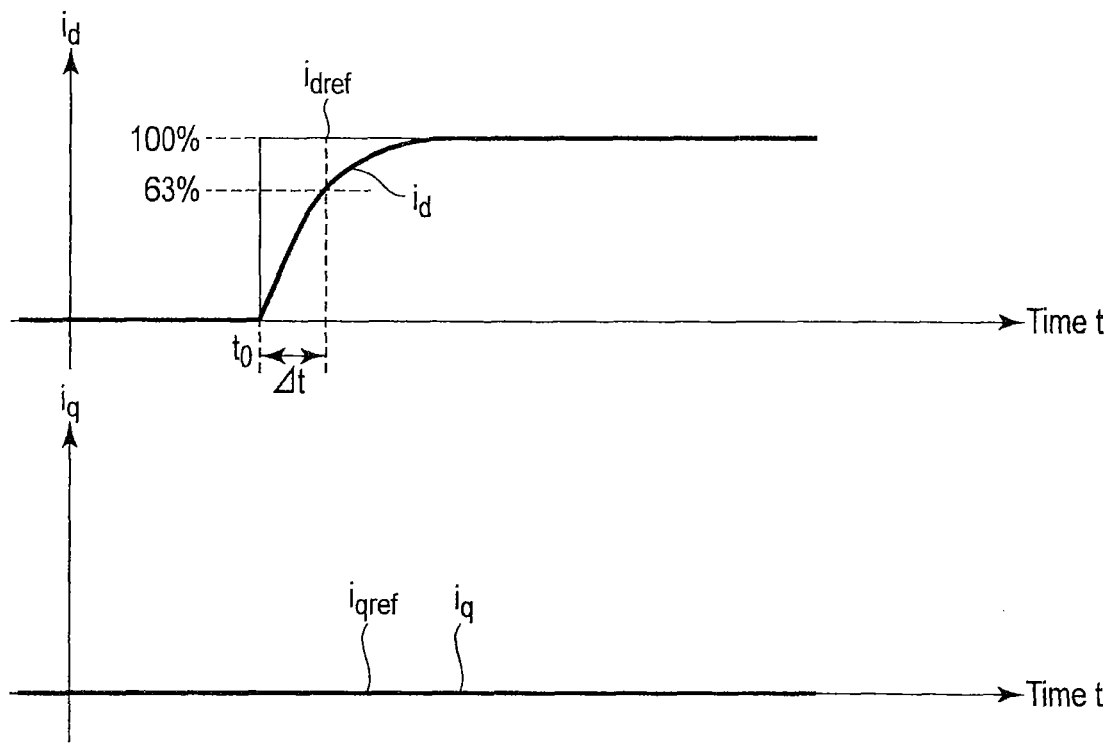
FIG. 6 is a graph illustrating an example of a step response of a d-axis current.

FIG. 6 is a graph illustrating an example of a step response of the d-axis current.

Next, a description is given of a current/voltage instruction for the inductance-equivalent value measure 10 to calculate an inductance value or an inductance-equivalent value. As described above, when the inductance value is calculated, the variation ratio of the d-axis current is used. Thus, it should suffice if the dq-axis current instructions idref, iqref are set to be idref=a value indicative of a predetermined variation, and iqref=0. In addition, the voltage instruction is an output voltage instruction of the current controller 2 at a time when the upper-level controller 1 inputs these current instructions to the current controller 2. In the case of current controller which adopts general PI (proportional integration) control, the current response is as illustrated in FIG. 6. At this time, by properly setting the gain of a PI controller, a response time constant Td of the d-axis current id can be designed, and when the d-axis is regarded as an LR circuit, the response time constant Td can be expressed by equation (7).

$$T_d = \frac{L_d}{R} \quad (7)$$

In the step response as shown in FIG. 6, since a time Δt, in which a current response reaches from 0 to 63% of the instruction, is the time constant Td, the time Δt is given by equation (8).

$$\Delta_t = \frac{L_d}{R} \quad (8)$$

When R is measured in advance, Ld can be calculated from Δt, without using the current variation ratio. In addition, in this case, Δt itself can be used as the inductance-equivalent value Lest.

Figure 7:
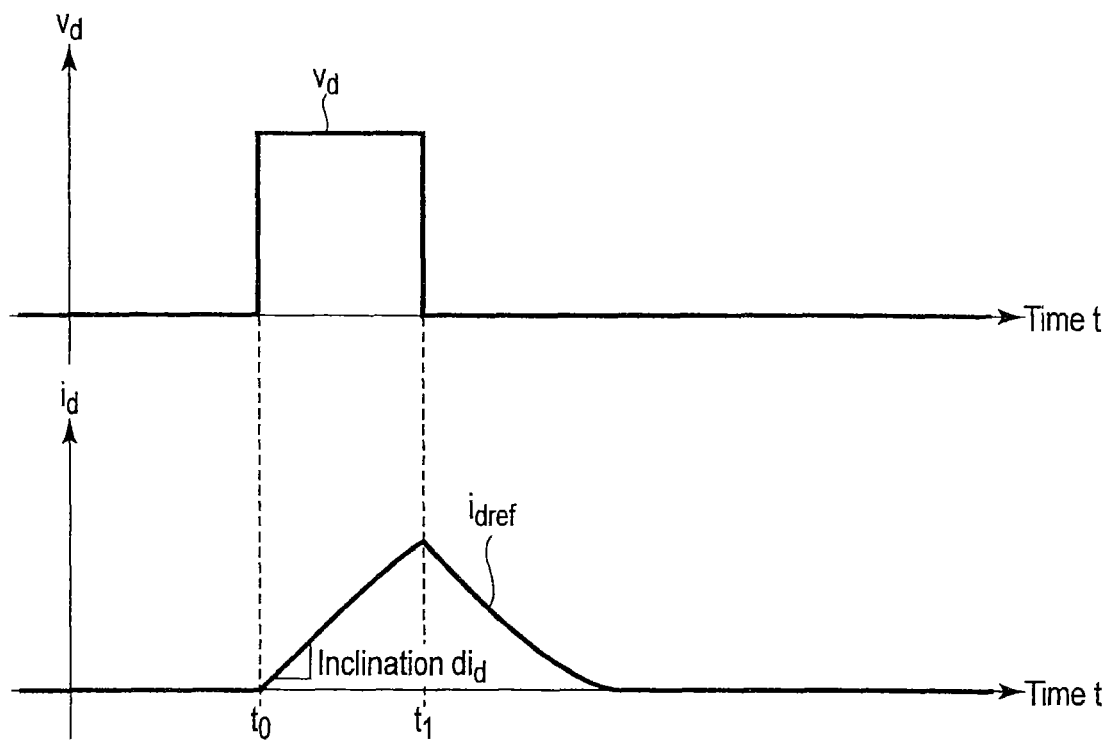
FIG. 7 is a graph illustrating an example of a d-axis current response at a time when a rectangular-wave voltage reference has been applied.

FIG. 7 is a graph illustrating an example of the d-axis current response at a time when a rectangular-wave voltage instruction has been applied.

When the inductance Ld is calculated based on equation (4), the output voltage of the current controller is set to be a rectangular-wave voltage as shown in FIG. 7, and if an inclination did of the current id is measured, the inclination $di_d$ is equivalent to variation ratio d/dt·id. Thus, the inductance Ld can be easily calculated. By this structure, the inductance-equivalent value Lest of the d-axis can be found from the current/voltage, and the estimation value of the magnet flux amount can be calculated based on the inductance-equivalent value Lest.

There may be a case in which the correlation between the inductance-equivalent value Lest and magnet flux φest becomes substantially an inverse-proportion characteristic, as indicated by equation (5), or there may be a case in which this correlation is expressed by a function of a second or more order. When the correlation is expressed by a function of a second or more order, the function may be stored and the magnet flux may be calculated from the inductance-equivalent value. However, since such a case is thinkable that the amount of arithmetic operation increases and a problem arises, it is possible to think of a method of storing the correlation in a table and finding the magnet flux by referring to the table.

The magnet flux estimation value φest, which has been calculated by the magnet flux estimator 11, may be sent to the upper-level controller 1.

The upper-level controller 1 may include a module 1A which compares the magnet flux estimation value φest and a preset first threshold, and adds a predetermined value to the current instruction value when the magnet flux estimation value φest is the first threshold or less. At this time, the value, which is to be added to the current instruction value, may be based on a table which prestores the magnet flux estimation value φ est or a value corresponding to the difference between the magnet flux estimation value φest and the first threshold, or may be a value which is calculated by a predetermined arithmetic expression using the magnet flux estimation value φest.

Furthermore, the module 1A may compare the magnet flux estimation value φest and a preset second threshold, and when the magnet flux estimation value φest is the preset second threshold or less, the module 1A may control a notification module 400, such as a display of a meter panel of the electric motor car, thereby notifying the user of an inspection/replacement time of the motor. In this case, the second threshold may be equal to the first threshold.

The magnet flux estimation value φest calculated by the magnet flux estimator 11 may be sent to the current controller 2.

The current controller 2 may include a module 2A which compares the magnet flux estimation value φest and a preset third threshold, and adds a predetermined value to the current instruction value when the magnet flux estimation value φest is the third threshold or less. At this time, the value, which is to be added to the current instruction value, may be based on a table which prestores a value corresponding to the difference between the magnet flux estimation value φest and the third threshold, or may be a value which is calculated by a predetermined arithmetic expression using the magnet flux estimation value φest.

In the meantime, it should suffice if the above-described process of adding the predetermined value to the current instruction value is executed by either the upper-level controller 1 or the current controller 2, and this process does not need to be executed by both.

When the magnetic force of the permanent magnet has decreased, a desired torque cannot be obtained in relation to the current instruction value. Thus, as described above, when the magnet flux estimation value φest is the predetermined threshold or less, the predetermined value is added to the current instruction value. Thereby, even when the magnetic force of the permanent magnet has decreased, a decrease in torque can be avoided.

As has been described above, according to the magnet flux estimation device and method, the synchronous motor driving device and the electric motor car of the present embodiment, such an advantage is obtained that the d-axis inductance-equivalent value can be measured in a short time without rotating the motor, and the estimation value of the magnet flux can be calculated.

Second Embodiment

FIG. 8 is a view illustrating an exemplary structure example of a magnet flux estimation device, a synchronous motor driving device and an electric motor car of a second embodiment.

In the structure of FIG. 8, compared to FIG. 1, a high-frequency voltage superimpose module 12, an adder 13 and a high-frequency current amplitude detection module 14 are newly added.

Figure 9:
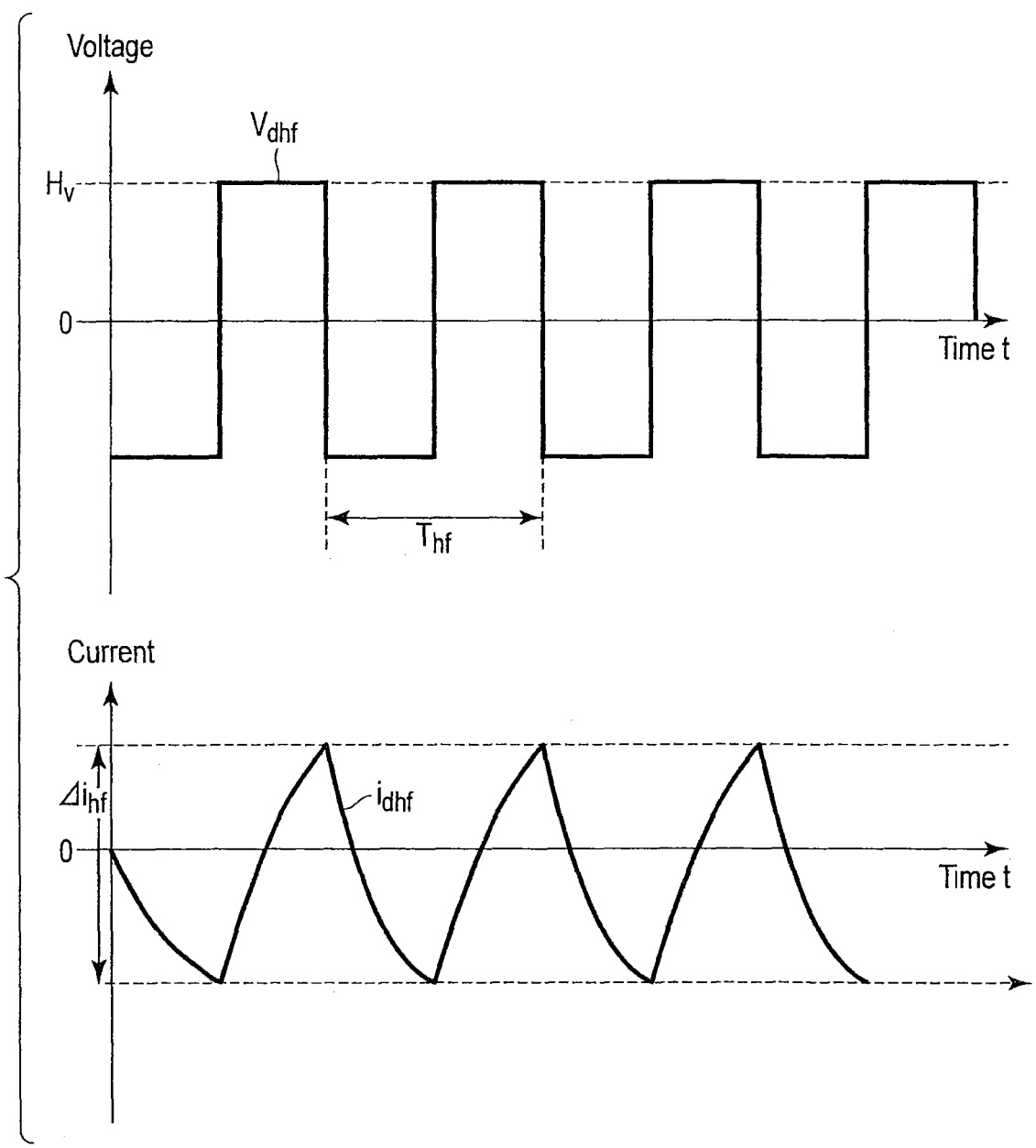
FIG. 9 is a graph illustrating an example of a high-frequency voltage and a corresponding high-frequency current waveform.

FIG. 9 is a graph illustrating an example of a high-frequency voltage and a corresponding high-frequency current waveform.

The high-frequency voltage superimpose module 12 outputs a high-frequency voltage vdhf, for example, as shown in part (a) of FIG. 9. In the adder 13, the high-frequency voltage vdhf is added to the d-axis voltage instruction Vd1 which is the output of the current controller 2, and a new d-axis voltage instruction Vd2 is calculated and is input to the coordinate convertor 3.

The high-frequency current amplitude detection module 14 measures an amplitude Δihf of a high-frequency current idhf which has been caused to flow by the high-frequency voltage vdhf which has been applied by the high-frequency voltage superimpose module 12. The high-frequency current idhf has a waveform as shown in part (b) of FIG. 9. Thus, if the amplitude Δihf between peaks is measured, it is possible to calculate, from equation (3), the d-axis inductance value by using an amplitude Hv of the high-frequency voltage and a high-frequency period Thf, as indicated from equation (9) to equation (10).

$$2H_v = L_d \frac{\Delta i_{hf}}{\frac{T_{hf}}{2}} \quad (9)$$

$$L_d = \frac{H_v T_{hf}}{\Delta i_{hf}} \quad (10)$$

At this time, if two of the amplitude Hv, high-frequency period Thf and amplitude Δihf are set or controlled to be fixed values, the other one can be set as the inductance-equivalent value Lest.

Next, the advantageous effects in the embodiment are described. In general, a current response value is affected by noise, etc., and an error occurs as an instantaneous value. If the calculation of the inductance-equivalent value and the estimation of the magnet flux are executed based on the current response value including an error, a magnet flux estimation value, which is obtained as a result, also includes an error.

To cope with this problem, if the amplitude of the high-frequency current is used, the amplitude can be calculated as a mean value during the period in which the high frequency is being applied. Thus, the influence of noise, etc. can be made smaller. At this time, the period in which the amplitude is averaged can be arbitrarily set within such a range that the influence of noise can be made smaller, and this period may be a short period corresponding to two or three high-frequency cycles, or may be a longer period than this period. If a longer period is selected, the influence of noise can be made further smaller. However, in a case where the magnet flux varies more gently due to the influence of, e.g. a temperature variation of the motor, there is such an influence that a correct magnet flux estimation value cannot be obtained. Thus, it should suffice if a proper number of periods is selected by taking these factors into account.

As has been described above, in the magnet flux estimation device and method according to the embodiment, such an advantage can be obtained that the d-axis inductance can be measured and the estimation value of the magnet flux can be calculated by a method in which the influence of noise is made smaller, without rotating the motor.

Third Embodiment

FIG. 10 is a view illustrating a structure example of a magnet flux estimation device, a synchronous motor driving device and an electric motor car of a third embodiment.

In FIG. 10, compared to FIG. 1, a d-axis bias current instruction value generator (a bias current module) 15, which causes a bias current to flow in the d-axis, is added. The d-axis bias current instruction value generator 15 generates a d-axis current instruction value which varies from an initial value at a predetermined rate of an increase. Incidentally, the d-axis bias current instruction value generator 15 may be composed as an element independent from the upper-level controller 1 in FIG. 1, or may be composed as an element included in the upper-level controller 1.

The magnet flux estimator 11 calculates an estimation value of the magnet flux, from at least either the inductance-equivalent value Lest or the d-axis current instruction value idref. At this time, the d-axis bias current instruction value, if controlled with no substantial error, may be replaced with the d-axis current response value.

The operation at the time of this structure will be described.

Figure 11:
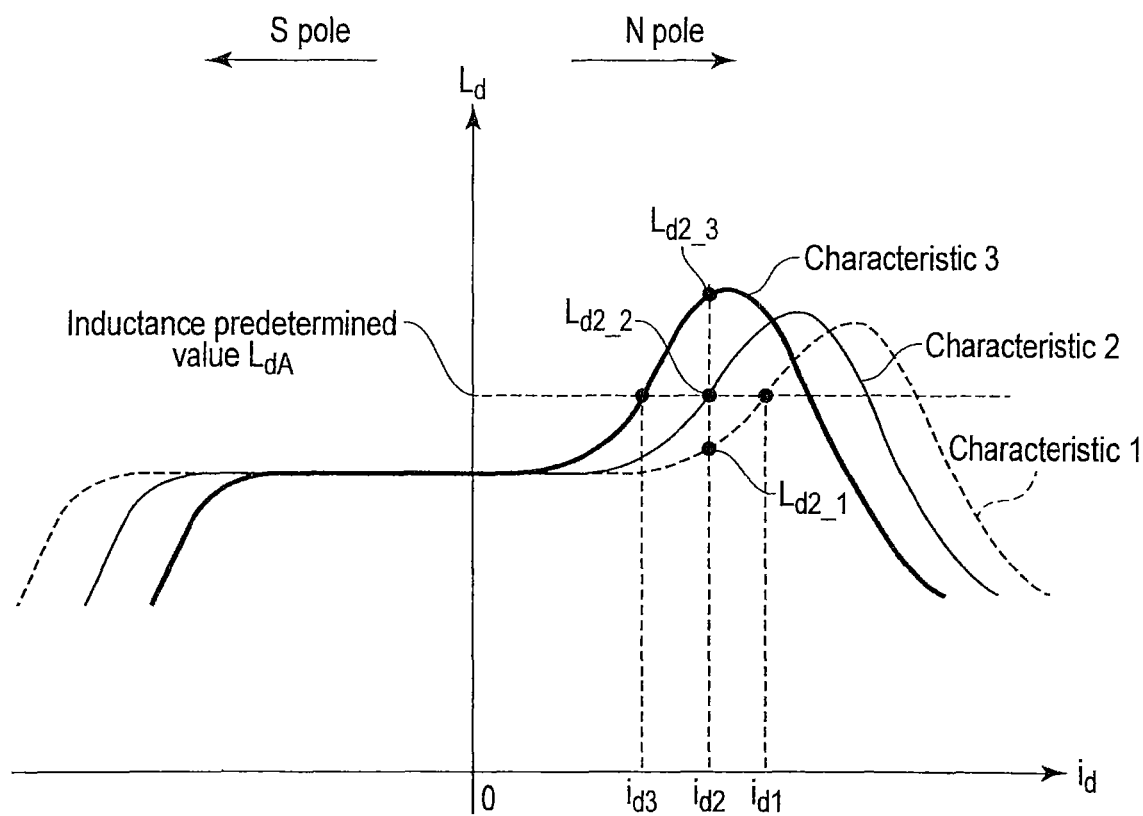
FIG. 11 is a graph illustrating an example of an inductance characteristic in a system of the third embodiment.

FIG. 11 is a graph illustrating an example of the inductance characteristic in the system of the third embodiment.

As described in connection with the first embodiment, the correlation between d-axis inductance value Ld and the magnet flux is as illustrated in FIG. 5. However, in the case of a motor with a strong magnet flux, as illustrated in FIG. 11, there may be a case in which no difference occurs in the d-axis inductance value at an operation point of id=0, in relation to the difference in magnet flux amount. In this case, however, when an increasing positive current is caused to flow as the current id, at an operation point where the d-axis inductance value increases to a predetermined value LdA or more, there is a correlation between the value of the current id and the magnet flux and thus the estimation value of the magnet flux can be calculated based on this correlation. Specifically, the magnet flux estimator 11 determines the magnet flux amount, based on a bias current value at a time when the d-axis bias current instruction value generator 15 varies the bias current and the d-axis inductance value exceeds the predetermined value LdA.

In addition, the d-axis inductance value has a maximum point at a predetermined value of the current id. The value of the current id at the maximum point and the d-axis inductance value at the maximum point also have a correlation with the magnet flux. Accordingly, for example, when an increasing positive current has been caused to flow as the current id, and the d-axis inductance value has changed from an increase to a decrease, the value of the current id at this time, that is, at the maximum point, or the inductance-equivalent value at the maximum point, is detected. Thereby, the estimation value of the magnet flux can also be calculated based on the above correlation. Specifically, the magnet flux estimator 11 determines the magnet flux amount, based on at least either the bias current value or the inductance value, at an operation point where the d-axis bias current instruction value generator 15 has successively varied the bias current and the d-axis inductance value has reached the maximum point.

In another method, a d-axis current operation point, at which the difference in magnet flux amount tends to appear as the difference in d-axis inductance value, is measured in advance. The d-axis bias current is caused to flow so that this d-axis current operation point may be reached, and the d-axis inductance value at this time is measured, and thereby the estimation value of the magnet flux amount can be calculated. As such a d-axis current operation point, for example, a point of id2 in FIG. 11 may be selected. If d-axis inductance values at this operation point are compared by characteristics 1 to 3, different values Ld2_1, Ld2_2 and Ld2_3 are exhibited. Thus, the estimation value of the magnet flux can be calculated from the d-axis inductance value. Specifically, the magnet flux estimator 11 determines the magnet flux amount, based on the d-axis inductance value at a time when the d-axis bias current instruction value generator 15 has set the bias current at the predetermined bias current value id2.

Needless to say, as has been described above in connection with the embodiments, the d-axis inductance value can be replaced with the inductance-equivalent value.

FIG. 12 is a view illustrating a control flow in the magnet flux estimation device, abnormal demagnetize determination device, synchronous motor driving device and electric motor car of the third embodiment. The magnet flux estimator 11 in this embodiment calculates the estimation value of the magnet flux, based on the above-described principle. FIG. 12 shows a control flowchart at a time when this structure is adopted.

To start with, the d-axis bias current instruction value generator 15 sets the bias current instruction value at the initial value. (Step ST1)

Then, the bias current instruction value is input from the d-axis bias current instruction value generator 15 to the current controller 2, and the current controller 2 executes a process and outputs voltage instructions Vd, Vq. (Step ST2)

The d-axis bias current instruction value generator 15 generates the instruction values so that the bias current may successively vary. At this time, for example, stepwise current instructions may be applied, or high-frequency voltages may be applied. (Step ST3)

Subsequently, the inductance-equivalent value measure 10 measures the d-axis current id of the response current value of the inverter 5. (Step ST4)

The inductance-equivalent value measure 10 calculates the inductance-equivalent value Lest, from the measured d-axis current id and the voltage instruction value Vd. (Step ST5).

The magnet flux estimator 11 receives the inductance-equivalent value Lest from the inductance-equivalent value measure 10, and determines whether the inductance-equivalent value Lest is a predetermined value or more. (Step ST6)

When the inductance-equivalent value Lest is the predetermined value or more, the magnet flux estimator 11 calculates the estimation value of the magnet flux amount, from the bias current value and the inductance-equivalent value Lest. (Step ST7)

When the inductance-equivalent value Lest is less than the predetermined value, the magnet flux estimator 11 varies the bias current value, and executes the process once again from step ST2. (Step ST8).

The advantageous effects in the above-described embodiment will be explained.

As has been described above, in the case of the motor in which the difference in magnet flux amount does not appear at the operation point of id=0, as illustrated in FIG. 11, the d-axis bias current is caused to flow. Thereby, the operation point is shifted to such an operation point that the difference in magnet flux amount appears in the inductance-equivalent value, and the estimation value can be calculated. Thus, as regards motors with wider characteristics, the exact magnet flux estimation can be made.

As has been described above, according to the magnet flux estimation device and method of the present embodiment, such an advantage is obtained that the estimation value of the magnet flux can exactly be calculated without rotating the motor, with respect to motors with wider characteristics.

Fourth Embodiment

FIG. 13 is a view illustrating a structure example of a magnet flux estimation device, an abnormal demagnetize determination device, a synchronous motor driving device and an electric motor car of a fourth embodiment.

FIG. 14 is a view illustrating another structure example of the magnet flux estimation device, abnormal demagnetize determination device, synchronous motor driving device and electric motor car of the fourth embodiment.

In FIG. 13 and FIG. 14, compared to FIG. 1, an abnormal demagnetize state determination module 16 is added.

The abnormal demagnetize state determination module 16 is determination module which receives, as an input, the estimated magnet flux amount, or the inductance-equivalent value and d-axis bias current value, determines whether an abnormal demagnetize state has occurred or not, and outputs an abnormal demagnetize state determination signal (or an error code notifying an abnormal demagnetize state).

FIG. 13 shows the structure in which the input to the abnormal demagnetize state determination module 16 is the magnet flux amount, and FIG. 14 shows the structure in which the input to the abnormal demagnetize state determination module 16 is the inductance-equivalent value and d-axis bias current value.

The operation at the time of this structure will be described.

To begin with, the abnormal demagnetize state means a state in which the permanent magnet in the rotor is irreversibly demagnetized due to a temperature rise, etc., and the original magnetic force is not restored. In this case, the magnet flux amount is considerably lower than the normal flux amount. In this state, since the magnet flux amount is not restored even if a demagnetize factor, such as temperatures, restores to the original state, it is necessary to detect this state as a motor failure, and to take a measure such as repair or replacement.

In the detection of the demagnetize state, as illustrated in FIG. 13, the flux amount $\phi$est estimated by the magnet flux estimator 11 is compared with an estimated magnet flux predetermined value. If the flux amount $\phi$est is the predetermined value or less, an abnormal demagnetize state can be determined. In addition, in the structure of FIG. 14, when the d-axis bias current instruction is increased, if the d-axis current, at a time when the d-axis inductance value has reached a predetermined value or more, is smaller than a predetermined value, an abnormal demagnetize state is determined.

FIG. 15 is a graph illustrating an example of inductance characteristics in an abnormal demagnetize state and a normal state.

In this example, since the maximum point shifts toward the origin in a demagnetize state, as indicated by a characteristic A in FIG. 15, the determination between an abnormal demagnetize state and a normal state can be executed.

Specifically, in FIG. 15, for example, in the characteristic A in the abnormal demagnetize state, a bias current id_A, at which the inductance-equivalent value is a predetermined value Ldref or more, is smaller than a predetermined value idref. In addition, in a characteristic B representing the normal state, a bias current id_B, at which the inductance-equivalent value is the predetermined value Ldref or more, is greater than the predetermined value idref. Thus, by increasing the d-axis bias current id from zero, the abnormal demagnetize state can be determined according to whether the bias id, at which the inductance-equivalent value becomes the predetermined value Ldref, is greater than the predetermined value idref. Specifically, the abnormal demagnetize state determination module 16 determines the abnormal demagnetize state, when the d-axis bias current instruction value generator 15 varies the bias current and the bias current value, at which the d-axis inductance-equivalent value exceeds the predetermined value Ldref, is smaller than the predetermined bias current value idref.

In another method, the abnormal demagnetize state can also be determined by the largeness/smallness of the d-axis inductance value at a time when the d-axis bias current id is controlled at the predetermined value idref. Specifically, the abnormal demagnetize state determination module 16 determines the abnormal demagnetize state, if the d-axis inductance-equivalent value, at a time when the d-axis bias current instruction value generator 15 has set the bias current at the predetermined value Ldref, is greater than the predetermined bias current value idref.

The advantageous effects in the above-described embodiment are described.

Conventionally, in the determination of the abnormal demagnetize state, a method of making use of a phenomenon, in which magnetic saturation occurs and inductance lowers, is publicly known. However, as indicated by id_SAT shown in FIG. 15, such a d-axis current that saturation occurs and inductance lowers is, in many cases, a relatively large current, and may become, in some cases, a current which is a tolerance current or more of the inverter which drives the motor. To cause such a large current to flow may shorten the life of the device, and is not preferable. In addition, in the case where the d-axis does not completely agree with the rotor magnetic pole axis, it is thinkable that a torque occurs if a large current is let to flow in the d-axis. In the above-described embodiment, a case is also assumed that the dq-axis is estimated by sensor-less control. However, there are many cases in which the estimated dq-axis does not completely agree with the rotor magnetic pole axis, and there is a good likelihood that a torque occurs if a large d-axis current is caused to flow. In addition, a large current requires a long rising time of current, and consequently much time is needed for detecting the demagnetize state. According to the present embodiment, the abnormal demagnetize state can be determined by a current of id_SAT or less, which is advantageous from the standpoint of the life of the device. Moreover, a torque which occurs can be reduced, and the time needed for detection can be shortened.

In the meantime, the abnormal demagnetize state determination module 16 may send to the upper-level controller 1 an abnormal demagnetize state determination signal or an error code notifying an abnormal demagnetize state. The upper-level controller 1 may include a module 1A' which adds a predetermined value to the current instruction value when the abnormal demagnetize state determination signal or the error code notifying an abnormal demagnetize state has been received. At this time, the value, which is to be added to the current instruction value, may be based on a preset table, or may be a value which is calculated by a predetermined arithmetic expression.

Furthermore, when the abnormal demagnetize state determination signal or the error code notifying an abnormal demagnetize state has been received, the module 1A' may control the control notification module 400, such as a display of a meter panel of the electric motor car, thereby notifying the user of an inspection/replacement time of the motor.

The abnormal demagnetize state determination module 16 may send to the current controller 2 an abnormal demagnetize state determination signal or an error code notifying an abnormal demagnetize state.

The current controller 2 may include module 2A' which adds a predetermined value to the current instruction value when the abnormal demagnetize state determination signal or the error code notifying an abnormal demagnetize state has been received. At this time, the value, which is to be added to the current instruction value, may be based on a preset table, or may be a value which is calculated by a predetermined arithmetic expression.

In the meantime, it should suffice if the above-described process of adding the predetermined value to the current instruction value is executed by either the upper-level controller 1 or the current controller 2, and this process does not need to be executed by both.

When the magnetic force of the permanent magnet has decreased, a desired torque cannot be obtained in relation to the current instruction value. Thus, as described above, when the abnormal demagnetize state has been determined, the predetermined value is added to the current instruction value. Thereby, even when the magnetic force of the permanent magnet has decreased, a decrease in torque can be avoided.

As has been described above, according to the magnet flux estimation device and method of the present embodiment, such an advantage is obtained that the abnormal demagnetize state can exactly be determined without rotating the motor, by a d-axis current which is lower than in the conventional art.

Fifth Embodiment

FIG. 16 is a view illustrating a structure example of a magnet flux estimation device, a synchronous motor driving device and an electric motor car of a fifth embodiment.

The electric motor car of this embodiment includes a current instruction setting module 1', current controller 2, coordinate convertor (dq/UVW) 3, triangular-wave PWM modulator 4, an inverter 5, current detector 6, a motor (PMSM) 7, a magnetic pole position detector 8, an inductance-equivalent value determination module, and a magnet flux estimator 11.

The inductance-equivalent value determination module includes coordinate convertor (UVW/dq) 9, a PWM output voltage restoration module 17, a carrier high-frequency component arithmetic module 18, an inductance-equivalent value arithmetic module 19, and magnet flux estimator 11.

In the present embodiment, the coordinate convertor (UVW/dq) 9 and the PWM output voltage restoration module 17 are d-axis component arithmetic module which calculates a d-axis component between a voltage instruction value, which is modulated by the triangular-wave PWM modulator 4, and a current response value. The carrier high-frequency component arithmetic module 18 is a frequency component arithmetic module which calculates a common frequency component of at least a carrier frequency or more, from the voltage instruction value and current response value of the d-axis component. The inductance-equivalent value arithmetic module 19 is a module configured to calculate a d-axis inductance-equivalent value from the voltage instruction value and current response value of the carrier frequency or more.

The current instruction setting module 1' outputs current instructions idref, iqref for estimating a magnet flux amount of the motor (PMSM) 7. At this time, the current instruction setting module 1' sets, for example, the current instruction idref at a positive predetermined value, and sets the current instruction iqref at zero. The current instruction setting module 1' may be included in the upper-level controller of the first embodiment, or may be provided separately from the upper-level controller.

Incidentally, the arithmetic of the magnet flux amount estimation value of the motor (PMSM) 7 is executed, for example, immediately after the torque instruction of the motor 7 has become zero.

The current controller 2 executes a control arithmetic operation so that current response values id, iq, which are detected in the current detector 6, may agree with the current instruction values idref, iqref, and determines voltage instruction values Vd, Vq. For this control arithmetic operation, for example, a proportional integration arithmetic operation is used.

The coordinate convertor (dq/UVW) 3 coordinate-converts, by using a rotational angle θm, the voltage instructions Vd, Vq of the dq-axis rotating coordinate system to voltage instructions Vu, Vv, Vw of the three-phase fixed coordinate system.

The triangular-wave PWM modulator 4 modulates, by triangular-wave PWM, the voltage instruction values (modulation factor instruction values) for driving the motor (PMSM) 7, and outputs a gate instruction which is an ON/OFF instruction of each phase switching device of the inverter 5 and also outputs a phase θc of a carrier wave which is used for PWM modulation.

The inverter 5 receives, as an input, the gate instruction for driving the inverter 5, and switches ON/OFF of a main circuit switching device which is built in the inverter 5, thereby alternately converting AC/DC power.

The current detector 6 detects current response values of two phases or three phases of the three-phase AC current which flows to the motor (PMSM) 7. FIG. 1 illustrates a structure in which currents of two phases (U phase and W phase) are detected.

The motor (PMSM) 7 is a permanent magnet synchronous motor. A magnetic field is generated by a three-phase AC current flowing in each excitation phase, and a torque is generated by a magnetic interaction with the rotor.

The magnetic pole position detector 8 is a module configured to detect a magnetic pole position of the permanent magnet synchronous motor including a permanent magnet within the rotor. For example, by a rotational angle sensor such as a resolver or an encoder, the magnetic pole position detector 8 detects the rotational angle of the rotor of the motor 7. In addition, in another method, the magnetic pole position detector 8 can electrically estimate the rotational angle of the rotor and can use the estimated value as a rotational angle value, by making use of a system which has been put to practical use as rotational angle sensor-less control.

The coordinate convertor 9 coordinate-converts current response values iu, iw of the three-phase fixed coordinate system to current response values id, iq of the dq-axis rotating coordinate system, by using the rotational angle θm.

The PWM output voltage restoration module 17 receives, as an input, the gate instruction and the rotational angle θm, restores a voltage instruction after PWM modulation from the gate instruction, and calculates a d-axis component thereof.

Figure 17:
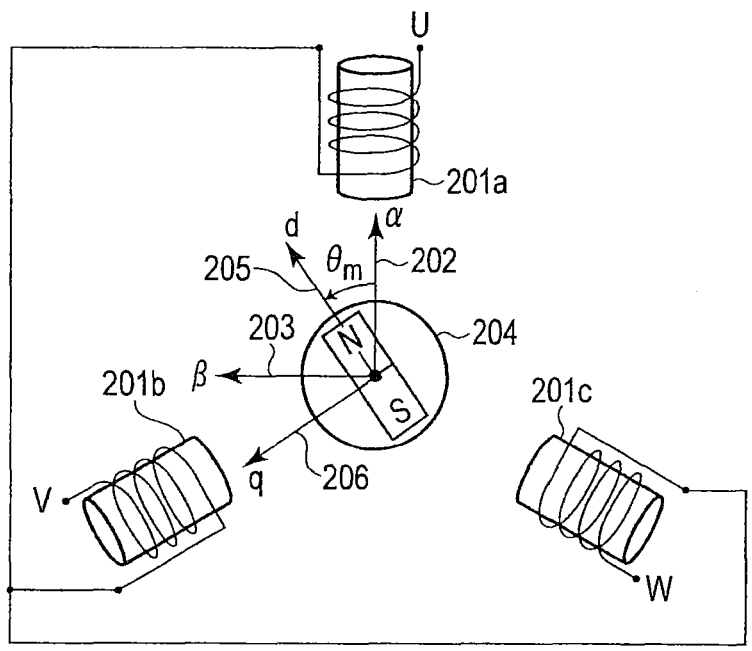
FIG. 17 is a view for explaining definitions of axes including a d-axis of the permanent magnet synchronous motor in the system of the fifth embodiment.

FIG. 17 is a view for explaining definitions of axes including a d-axis of the permanent magnet synchronous motor in the present embodiment.

Stator coils 201a, 201b and 201c are coils of a U phase, V phase and W phase of the stator, respectively.

An αβ-axis fixed coordinate system is a coordinate system in which an α-axis (first axis) 202 agrees with a U phase direction (a direction from the center of a rotor 204 toward the stator coil 201a of the U phase), and β-axis (second axis) 203 advances by 90 degrees in phase, relative to the α axis 202. A dq-axis rotating coordinate system is a coordinate system in which a d-axis 205 agrees with the direction of the magnetic pole of the rotor 204, and a q-axis 206 advances by 90 degrees in phase, relative to the d-axis. A rotational angle θm at this time is the angle of the d-axis 205, as viewed from the α axis 202.

Figure 18:
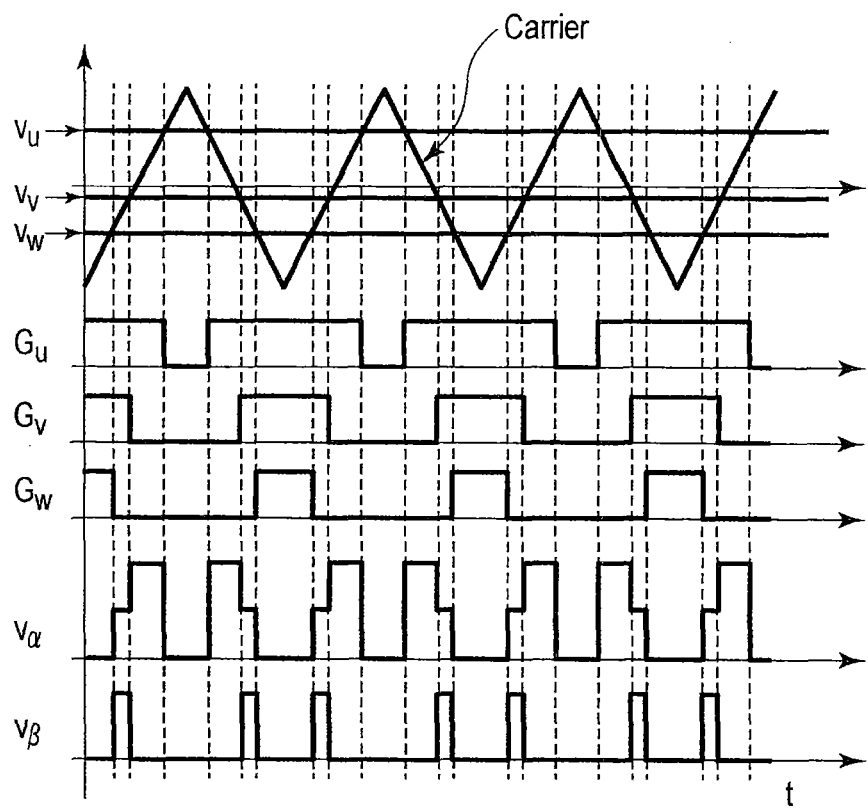
FIG. 18 is a view illustrating an example of voltage references after PWM modulation, which are restored based on a gate reference.

FIG. 18 is a view illustrating an example of voltage instructions after PWM modulation, which are restored based on a gate instruction.

In FIG. 18, each voltage instruction Vu, Vv, Vw is converted to a gate signal to the inverter 5 by PWM modulation. The description in FIG. 18 relates to upper arm gate signals Gu, Gv, Gw of the inverter 5. Lower arm gate signals are signals obtained by inverting the logic of the upper arm gate signals Gu, Gv, Gw. Usually, in order to prevent a failure of an element, an upper/lower arm short-circuit prevention period (dead time) is added to the upper/lower arm gate signal. When the gate signal of the upper/lower arm is switched, a period, in which both gate signals are turned off for a predetermined time, is provided. In the present embodiment, the dead time is omitted since it is sufficiently small and negligible.

If the voltage instruction Vu, Vv, Vw, which is converted to the gate signal Gu, Gv, Gw, as described above, is converted to a value on an orthogonal coordinate system, the converted value becomes like a value Vα, Vβ shown in a lower part of FIG. 18. FIG. 18 shows voltage instructions converted to the αβ-axis of the coordinate system at rest in FIG. 17.

FIG. 19 is a view illustrating an example of spatial vectors of gate signals in the αβ-axis of the coordinate system at rest.

In order to convert the gate signal Gu, Gv, Gw to the αβ-axis voltage instruction, it should suffice if a value converted on the αβ-axis is calculated with respect to the spatial vector corresponding to the gate signal. FIG. 19 shows the case in which the length of the spatial vector is normalized to 1, but an actual voltage value corresponding to an inverter DC voltage may be used for this value.

Incidentally, numerals (0 or 1) in parentheses, which are added to each vector name ($V_0$~$V_7$), represent gate signals, and are arranged in the order of (Gu, Gv, Gw). If these numerals are regarded as binary numbers with successive bits and converted to decimal numbers, the numbers become vector numbers (nest numbers of vector names).

Further, the PWM output voltage restoration module 17 calculates a d-axis component by an arithmetic operation of equation (11), from the voltage instruction converted to the value of the αβ coordinate system, as described above.

$$v_d = v_\alpha \cos(\theta_m) + v_\beta \sin(\theta_m) \quad (11)$$

Figure 20:
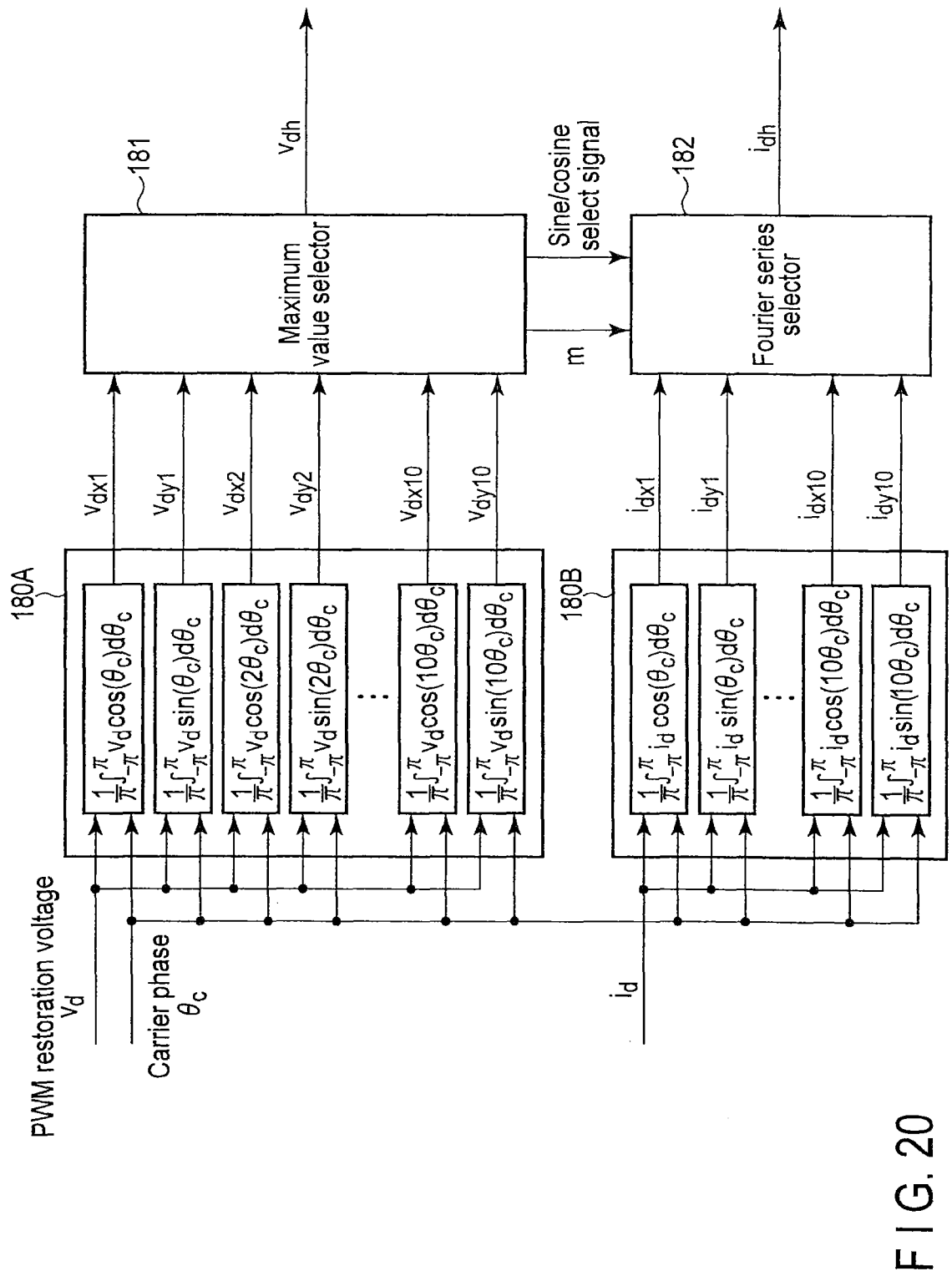
FIG. 20 is a view illustrating an example of exemplary process blocks of carrier high-frequency component arithmetic module of the magnet flux estimation device, abnormal demagnetize determination device, synchronous motor driving device and electric motor car of the fifth embodiment.

FIG. 20 is a view illustrating an example of process blocks of the carrier high-frequency component arithmetic module 18 of the magnet flux estimation device, abnormal demagnetize determination device, synchronous motor driving device and electric motor car of the present embodiment.

The carrier high-frequency component arithmetic module 18 includes a voltage Fourier series arithmetic module 180A, a current Fourier series arithmetic module 180B, a maximum value selector 181 and a Fourier series selector 182.

The voltage Fourier series arithmetic module 180A and the current Fourier series arithmetic module 180B of the carrier high-frequency component arithmetic module 18 calculate, by equation (12) and equation (13), high-frequency components of a common frequency of a carrier frequency or more, from the d-axis current response id and PWM restoration voltage vd. In equations (12) and (13), Fourier series of input vd, id is calculated.

$$\begin{cases} v_{dxn} = \frac{1}{\pi} \int_{-\pi}^{\pi} v_d \cos(n\theta_c) d\theta_c \\ v_{dyn} = \frac{1}{\pi} \int_{-\pi}^{\pi} v_d \sin(n\theta_c) d\theta_c \end{cases} \quad (12)$$

$$\begin{cases} i_{dxn} = \frac{1}{\pi} \int_{-\pi}^{\pi} i_d \cos(n\theta_c) d\theta_c \\ i_{dyn} = \frac{1}{\pi} \int_{-\pi}^{\pi} i_d \sin(n\theta_c) d\theta_c \end{cases} \quad (13)$$

In the equations, θc is a phase representing a progressive state of a triangular-wave carrier, and is input from the triangular-wave PWM modulator 4. In addition, n is an order number, with the carrier frequency component being a first order, and is an integer value of 1 or more. Theoretically, n is an integer value of 1 or more, and can be calculated without an upper limit. However, at a time of implementation on an actual control device, there are restrictions to an arithmetic amount, etc., and it is thus desirable to execute an arithmetic operation with respect to each order, by setting n at an effective value (about 1 to 10).

The maximum value selector 181 compares respective Fourier series values of the PWM restoration voltage vd, and selects a Fourier series value with a maximum absolute value and output it as vdh. The maximum value selector 181 output the order m of vdh and sine/cosine select signal to the Fourier series selector 182.

The Fourier series selector 182 outputs, as idh, that one of Fourier series idxm, idym, which is different from a sine/cosine component selected as vdh, with respect to the same order m as the Fourier series of the voltage vd selected by the maximum value selector 181. For example, when a second-order cosine component has been selected as a maximum value in the maximum value selector 181, vdx2 is selected as vdh, and sine/cosine select signal indicates that vdh is a cosine component, and idy2 is selected as idh, and these are output. At this time, when a cosine component has been selected as vdh, a sine component selected as idh is output with an inverted sign, in order to calculate an inductance-equivalent value to be described later. Specifically, idh is set so as to become idh=d/dt·id.

The inductance-equivalent value arithmetic module 19 calculates a d-axis inductance Ld or an equivalent value thereof, from the d-axis current response value id, and outputs the calculated value as an inductance-equivalent value Lest. The d-axis inductance Ld appears in a voltage equation of the PMSM, as indicated in expression (1). Since the d-axis inductance Ld is a correlation coefficient of the d-axis current response value id and dq-axis voltage value vd, vq, the relational expression of Ld can be expressed by a simple equation like equation (2), under the condition of, for example, the number of revolutions ω=0, iq=0.

In equation (2), when attention is paid to a high frequency component of the carrier frequency or more, the first term R can be ignored since the first term R is sufficiently smaller than the second term pLd, and Ld can be expressed by equation (3).

From equation (3), if vdh and idh calculated by the carrier high-frequency component arithmetic module 18 are used, the inductance Ld is given by equation (14).

$$Ld = vdh/idh \quad (14)$$

In this case, as regards a differential operator d/dt in equation (3), the arithmetic operation is omitted by selecting the sine/cosine component of the current, which is different from the Fourier series of the voltage, by the carrier high-frequency component arithmetic module 18, and it is assumed that the same arithmetic operation as a differential process has been executed. In general, since a differential arithmetic operation is susceptible to noise, the influence of measurement noise can be reduced by avoiding the differential arithmetic operation.

The inductance-equivalent value arithmetic module 19 outputs Ld, which has been calculated as described above, as the inductance-equivalent value Lest.

The magnet flux estimator 11 receives, as an input, the inductance-equivalent value Lest and d-axis current response value id, and calculates a magnet flux estimation value φest. In the estimation method, for example, the inductance-equivalent value Lest, current response value id and magnet flux estimation value φest are stored in a table, and the magnet flux estimation value φest is found by referring to this table.

Next, a description is given of the principle in which the estimation value of the magnet flux can be calculated from the d-axis inductance-equivalent value Lest in the magnet flux estimator 11.

The characteristics of the PMSM are the same as, for example, the characteristics in the first embodiment, and the PMSM in the present embodiment has the same structure as shown in 3. That a positive current is caused to flow as a d-axis current by setting an N pole direction of the magnetic pole as a d-axis means that a current is caused to flow so as to intensity the flux of the magnet. In addition, it is assumed that the d-axis inductance Ld is determined by equation (6), from a d-axis current variation amount Δid and a d-axis flux variation amount Δφd.

FIG. 21 is a graph illustrating an example of inductance characteristics in the magnet flux estimation device, abnormal demagnetize determination device, synchronous motor driving device and electric motor car of the present embodiment.

In the case of the IPMSM having such a structure that magnets 300 to 301 are embedded within the rotor and bridge portions 302 to 304 of the iron core are provided on both sides of each magnet, as shown in FIG. 3, the flux produced from the N pole side of the magnet reaches the S pole side via the bridge portions 302 to 304, and thus the bridge portions are magnetically saturated by the magnet flux.

At this time, if a positive current is caused to flow in the d-axis direction shown in FIG. 3, a flux is formed in the same direction as the d-axis by the stator coil. Thus, the flux produced from the N pole of the magnet forms such a path as to reach the S pole side through the stator, without passing through the bridge portions 302 to 304. The flux of the bridge portions 302 to 304 decreases, and the magnetic saturation of these portions is relaxed, and thus the d-axis inductance Ld increases. Further, if the d-axis current is increased, the magnetic path through the stator begins to be magnetically saturated, so the d-axis inductance decreases. Thereby, the d-axis inductance Ld has characteristics, as indicated by characteristics 21A to 21C in FIG. 21.

The characteristics 21A to 21C in FIG. 21 indicate states with different amounts of magnet flux. The estimation value of the magnet flux amount can be calculated from the d-axis inductance Ld at a time when a bias current of idA, at which a largest difference occurs in d-axis inductance Ld between the respective characteristics, was caused to flow.

In addition, it is understood that when id is increased from zero, the values of id, at a time when the d-axis inductance Ld has decreased below a preset lower limit value Ld1, become different between the characteristics 21A to 21C. Thereby, the estimation value of the magnet flux amount can be calculated from the value of id at a time when the d-axis inductance Ld has decreased below the lower limit value Ld1.

Besides, the estimation value of the magnet flux amount may be calculated based on the current response value id at a time when the d-axis inductance Ld has decreased below the lower limit value Ld1, as described above, or the estimation value of the magnet flux amount may be calculated based on a current response value id at a time when the d-axis inductance Ld has exceeded an upper limit value.

Furthermore, the magnet flux amount estimator may calculate the estimation value of the magnet flux amount, based on a d-axis inductance-equivalent value at a time when a bias current of a preset predetermined value has been applied to the motor 7. As has been described above in connection with the third embodiment, the d-axis bias current instruction value, if controlled with no substantial error, may be replaced with the d-axis current response value. In other words, by treating the d-axis current response value id like the d-axis bias current value, the estimation value of the magnet flux amount can be calculated based on the d-axis inductance-equivalent value at a time when the bias current of a predetermined value has been applied to the motor 7.

Besides, in the present embodiment, the magnet flux amount estimator can calculate the estimation value of the magnet flux in the same manner as the method described in connection with the first to fourth embodiments.

Moreover, in the present embodiment, while the arithmetic operation of estimating the magnet flux is being executed, the carrier frequency of the triangular-wave PWM modulator 4 may be increased. In this embodiment, the magnet flux amount is estimated based on the carrier high-frequency component included in the voltage instruction value and current response value. At this time, however, there is a case in which noise occurs due to the carrier high-frequency component. This noise is smaller than noise at a time of superimposition of a high-frequency current, but this noise should preferably be reduced as much as possible.

Taking this into account, in the present embodiment, the carrier frequency is set at a frequency of an audible range or higher (in general, about 15 kHz or above). Thereby, noise due to the carrier high frequency can be made hardly audible.

By setting the carrier frequency as described above, the d-axis inductance can be measured and the magnet flux can be estimated, with the noise due to the carrier high frequency being made hardly audible. As has been described above, in the magnet flux amount estimation device, synchronous motor driving device and electric motor car according to the present embodiment, the same advantageous effects as in the above-described embodiments can be obtained.

Furthermore, the d-axis inductance-equivalent value is calculated based on the carrier high-frequency component included in the voltage and current by PWM modulation, and thereby such an advantage can be obtained that the estimation value of the magnet flux can be calculated without superimposing a high-frequency voltage.

In the above-described plural embodiments, like the first embodiment, the module 1A, 2A for adding the predetermined value to the current instruction value (or the module configured to notify the notification module 400) may further be provided.

Moreover, in the above-described plural embodiments, like the fourth embodiment, the magnet flux estimation device and electric motor car may further include the abnormal demagnetize state determination module, and may further include the module 1A', 2A' for adding the predetermined value to the current instruction value (or the module configured to notify the notification module 400).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnet flux amount estimation device comprising:
a magnetic pole position detector configured to detect a magnetic pole position of a permanent magnet synchronous motor including a permanent magnet within a rotor;
an inductance-equivalent value determination module configured to determine an inductance-equivalent value of a d-axis corresponding to a determined magnetic pole direction; and
a magnet flux amount estimator configured to calculate an estimation value of a magnet flux amount of the permanent magnet, based on the inductance-equivalent value,
wherein the inductance-equivalent value determination module includes a module configured to calculate an inductance-equivalent value of the d-axis, by using a signal produced by pulse width modulation (PWM)-modulating a voltage instruction value for controlling a response current which is applied to the permanent magnet synchronous motor, a d-axis component of a response current which is supplied from an inverter for driving the permanent magnet synchronous motor to the permanent magnet synchronous motor, a carrier phase which is used for PWM modulation of the voltage instruction, and the magnetic pole position.

2. The magnet flux amount estimation device of claim 1, wherein the inductance-equivalent value determination module includes:
- a PWM output voltage restoration module configured to calculate a d-axis component of the voltage instruction from the signal produced by PWM-modulating the voltage instruction, and the magnetic pole position;
- a carrier high-frequency component arithmetic module configured to calculate a common frequency component of at least a carrier frequency of the voltage instruction value and the current response value, using an output of the PWM output voltage restoration module, a d-axis component value of the response current, and the carrier phase; and
- an inductance-equivalent value arithmetic module for calculating an inductance-equivalent value of the d-axis direction, using the voltage instruction value and the current response value of the carrier frequency or more.

3. The magnet flux amount estimation device of claim 1, wherein the magnet flux amount estimator calculates the estimation value of the magnet flux amount, based on a current response value at an operation point at which the inductance-equivalent value of the d-axis direction has exceeded at least one of a predetermined upper limit value and lower limit value.

4. The magnet flux amount estimation device of claim 1, wherein the magnet flux amount estimator calculates the estimation value of the magnet flux amount, based on an inductance-equivalent value of the d-axis direction at a time when a preset predetermined bias current has been applied to the permanent magnet synchronous motor.

5. The magnet flux amount estimation device of claim 1, wherein when the estimation value of the magnet flux amount is calculated, the carrier frequency is increased.

6. The magnet flux amount estimation device of claim 1, wherein the calculation of the estimation value of the magnet flux amount is executed immediately after a torque instruction to the permanent magnet synchronous motor has become zero.

7. The magnet flux amount estimation device of claim 1, further comprising a module configured to determine an abnormal demagnetize state when the calculated estimation value of the magnet flux amount is less than or equal to a predetermined value.

8. A synchronous motor driving device comprising:
the magnet flux amount estimation device of claim 1;
an inverter configured to rotate the permanent magnet synchronous motor; and
an inverter controller configured to control the inverter, based on the magnetic pole position detected by the magnetic pole position detector, an input current instruction value, and a current response value applied to the permanent magnet synchronous motor.

9. The synchronous motor driving device of claim 8, wherein the inverter controller includes a module configured to
receive an estimation value of the magnet flux which has been calculated by the magnet flux amount estimation device, and
add a predetermined value to an input current instruction value when the estimation value of the magnet flux is less than or equal to a threshold.

10. A synchronous motor driving device comprising:
the magnet flux amount estimation device of claim 7;
an inverter configured to rotate and drive the permanent magnet synchronous motor; and
an inverter controller configured to control the inverter, based on the magnetic pole position detected by the magnetic pole position detector, an input current instruction value, and a current response value applied to the permanent magnet synchronous motor.

11. The synchronous motor driving device of claim 10, wherein the module configured to determine the abnormal demagnetize state notifies an error code to the inverter controller when the abnormal demagnetize state has been determined, and
the inverter controller includes a module configured to add a predetermined value to an input current instruction value, when the error code has been received from the module configured to determine the abnormal demagnetize state.

12. An electric motor car comprising:
the synchronous motor driving device of claim 8;
a DC power supply configured to supply a DC power to the inverter;
the inverter configured to convert the DC power supplied from the DC power supply to an AC power;
the permanent magnet synchronous motor configured to operate by the AC power supplied from the inverter; and
an axle configured to be driven by a driving force of the permanent magnet synchronous motor.

13. The electric motor car of claim 12, further comprising an upper-level controller configured to send a current instruction value to the inverter controller, wherein
the upper-level controller includes a module configured to receive an estimation value of the magnet flux which has been calculated by the magnet flux estimation device, and
add a predetermined value to an input current instruction value when the estimation value of the magnet flux is less than or equal to a threshold.

14. An electric motor car comprising:
the synchronous motor driving device of claim 10;
a DC power supply configured to supply a DC power to the inverter;
the inverter configured to convert the DC power supplied from the DC power supply to an AC power;
the permanent magnet synchronous motor configured to operate by the AC power supplied from the inverter; and
an axle configured to be driven by a driving force of the permanent magnet synchronous motor.

15. The electric motor car of claim 14, wherein the module configured to determine the abnormal demagnetize state notifies an error code to the upper-level controller when the abnormal demagnetize state has been determined, and
the upper-level controller includes a module configured to add a predetermined value to an input current instruction value, when the error code has been received from the module configured to determine the abnormal demagnetize state.

16. The electric motor car of claim 13, further comprising notification module configured to notify a user of an abnormality,
wherein the module configured to determine the abnormal demagnetize state notifies an error code to the upper-level controller when the abnormal demagnetize state has been determined, and
the upper-level controller includes a module configured to control the notification module and notify a user of the abnormality, when the error code has been received from the module configured to determine the abnormal demagnetize state.

17. The electric motor car of claim 14, further comprising notification module configured to notify a user of an abnormality,
- wherein the module configured to determine the abnormal demagnetize state notifies an error code to the upper-level controller when the abnormal demagnetize state has been determined, and
- the upper-level controller includes a module configured to control the notification module and notify a user of the abnormality, when the error code has been received from the module configured to determine the abnormal demagnetize state.

18. The electric motor car of claim 15, further comprising a notification module configured to notify a user of an abnormality,
- wherein the upper-level controller includes a module configured to control the notification module and notify a user of the abnormality, when the error code has been received from the module configured to determine the abnormal demagnetize state.

* * * * *